US012571688B2

(12) United States Patent
Young et al.

(10) Patent No.: US 12,571,688 B2
(45) Date of Patent: Mar. 10, 2026

(54) WIRELESS MULTI-POINT FOOD THERMOMETER

(71) Applicant: Combustion, LLC, Seattle, WA (US)

(72) Inventors: Christopher Young, Seattle, WA (US);
Levi Miller, Issaquah, WA (US);
George Harris, Fairfax, VA (US);
Joseph Modro, Los Gatos, CA (US)

(73) Assignee: Combustion, LLC, Seattle, WA (US)

( * ) Notice: Subject to any disclaimer, the term of this patent is extended or adjusted under 35 U.S.C. 154(b) by 833 days.

(21) Appl. No.: 17/568,589

(22) Filed: Jan. 4, 2022

(65) Prior Publication Data

US 2022/0381624 A1     Dec. 1, 2022

Related U.S. Application Data

(60) Provisional application No. 63/133,683, filed on Jan. 4, 2021.

(51) Int. Cl.
*G01K 7/22* (2006.01)
*G01K 3/14* (2006.01)
*G01N 25/18* (2006.01)

(52) U.S. Cl.
CPC ................. *G01K 7/22* (2013.01); *G01K 3/14* (2013.01); *G01N 25/18* (2013.01); *G01K 2207/06* (2013.01)

(58) Field of Classification Search
None
See application file for complete search history.

(56) References Cited

U.S. PATENT DOCUMENTS

| | | | |
|---|---|---|---|
| 3,582,921 A | 6/1971 | Krieger | |
| D330,170 S | 10/1992 | Arioka | |

(Continued)

FOREIGN PATENT DOCUMENTS

| | | | |
|---|---|---|---|
| CA | 3073468 A1 | 3/2019 | |
| EP | 0687866 A1 | 12/1995 | |

(Continued)

OTHER PUBLICATIONS

International Search Report and Written Opinion, dated Sep. 10, 2024, for International Patent Application No. PCT/US2024/035393. (15 pages).

(Continued)

*Primary Examiner* — Erica S Lin
(74) *Attorney, Agent, or Firm* — Seed Intellectual Property Law Group LLP

(57) ABSTRACT

One or more implementations of the present disclosure relate to a wireless, multi-sensor food thermometer that includes a temperature probe having a linear array of temperature sensors that are operative to measure: temperature profiles within a food product during a cooking process, a temperature at a core of the food product, a temperature at the surface of the food product, and a temperature of the ambient cooking environment in which the food is being cooked. The temperature probe includes a wireless interface that transmits temperature information to one or more external devices for use thereby. Rather than transmitting raw temperature data, the temperature probe may transmit coefficients that correspond to a function that describes the temperature profile within the food or parameters necessary to solve a governing heat equation, which reduces data transmission requirements and reduces power consumption. The food thermometer may include a charger case that (Continued)

houses the temperature probe and charges a power source of the temperature probe using a replaceable battery.

11 Claims, 31 Drawing Sheets

(56) References Cited

U.S. PATENT DOCUMENTS

| | | | |
|---|---|---|---|
| D336,862 S | 6/1993 | Ayton et al. | |
| 6,379,039 B1* | 4/2002 | Tseng | G01K 13/20 |
| | | | 374/170 |
| 6,554,516 B1* | 4/2003 | Christopher | B43K 29/05 |
| | | | 401/29 |
| 7,075,442 B2 | 7/2006 | Lion et al. | |
| 7,895,942 B2 | 3/2011 | Karau | |
| D675,114 S | 1/2013 | Lacotta et al. | |
| D675,115 S | 1/2013 | Lacotta et al. | |
| D675,116 S | 1/2013 | Lacotta et al. | |
| 8,635,947 B2 | 1/2014 | Karau | |
| 9,526,376 B2 | 12/2016 | Karau | |
| 10,024,736 B2 | 7/2018 | Nivala et al. | |
| D855,483 S | 8/2019 | Aidehag | |
| 10,653,272 B2 | 5/2020 | Karau | |
| 10,670,470 B2 | 6/2020 | Nivala et al. | |
| D974,197 S | 1/2023 | Mizrahi et al. | |
| 2002/0073853 A1 | 6/2002 | Norcross | |
| 2004/0056812 A1 | 3/2004 | Sabet et al. | |
| 2008/0043809 A1 | 2/2008 | Herbert | |
| 2009/0056139 A1 | 3/2009 | Royle | |
| 2013/0070434 A1 | 3/2013 | Buschel et al. | |
| 2016/0025222 A1 | 1/2016 | Buchholz et al. | |
| 2016/0377490 A1 | 12/2016 | Nivala et al. | |
| 2018/0364107 A1 | 12/2018 | Kessler et al. | |
| 2019/0339133 A1* | 11/2019 | Pulvermacher | G01K 1/022 |
| 2021/0231503 A1 | 7/2021 | Wu et al. | |
| 2021/0321819 A1 | 10/2021 | Baldwin et al. | |
| 2022/0047108 A1 | 2/2022 | Poulton | |
| 2022/0381624 A1 | 12/2022 | Young et al. | |

FOREIGN PATENT DOCUMENTS

| | | | |
|---|---|---|---|
| EP | 1069416 A1 | 1/2001 | |
| EP | 2063183 B1 | 6/2013 | |
| EP | 2741061 A1 | 6/2014 | |
| EP | 2026632 B1 | 1/2017 | |
| WO | WO 2019052613 A1 | 3/2019 | |

OTHER PUBLICATIONS

International Search Report and Written Opinion, mailed Mar. 29, 2022, for International Patent Application No. PCT/US2022/011185. (15 pages).

European Search Report, dated Nov. 14, 2024, for corresponding Application No. 22734849.7. (17 pages).

* cited by examiner

SECTION A-A

SECTION B-B

OVERMOLD, TEMPERATURE PROBE

112

102

TIP, TEMPERATURE PROBE

110

114

116

115

FOAM CARRIER

PCBA + FPC
TEMPERATURE PROBE

SECTION A-A

SECTION B-B

CONTACT RING,
LOWER CHARGER

126

124

CHARGER CONTACTS,
LOWER CHARGER

128

CAP, LOWER CHARGER

122

INSULATION, LOWER CHARGER

120

HOUSING, LOWER CHARGER

104b

SECTION A-A

SECTION B-B

CAP, UPPER CHARGER

CONTACT, NEG. BATTERY

142

138

136

104a

135

134

PCBA, UPPER CHARGER

CONTACT, NEG. CHARGER

140

AAA BATTERY

INSULATION, UPPER CHARGER

132

130

HOUSING, UPPER CHARGER

SECTION A-A

SECTION B-B

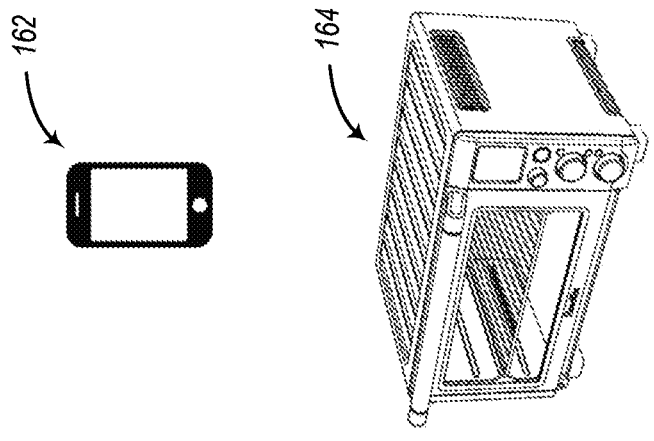
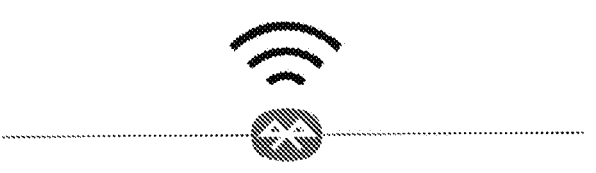
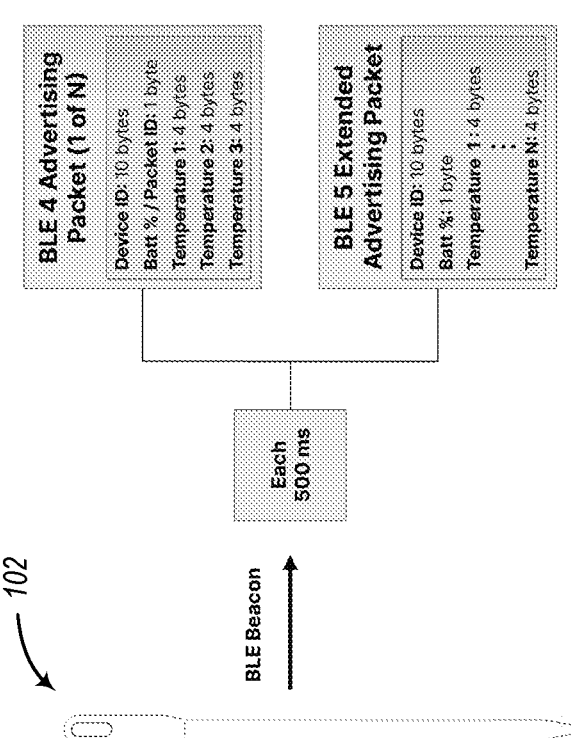
*FIG. 10*

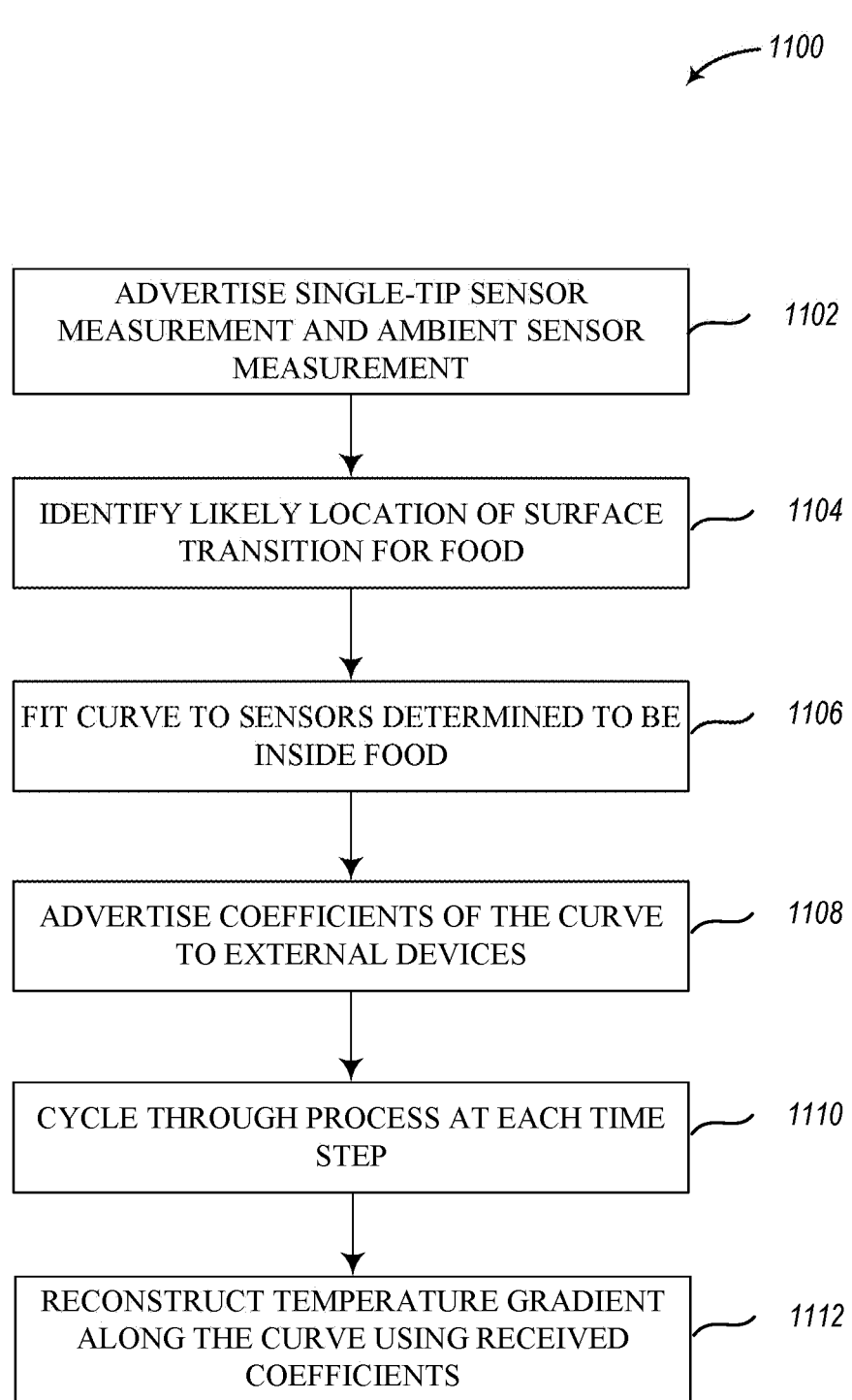

*1100*

ADVERTISE SINGLE-TIP SENSOR MEASUREMENT AND AMBIENT SENSOR MEASUREMENT — *1102*

IDENTIFY LIKELY LOCATION OF SURFACE TRANSITION FOR FOOD — *1104*

FIT CURVE TO SENSORS DETERMINED TO BE INSIDE FOOD — *1106*

ADVERTISE COEFFICIENTS OF THE CURVE TO EXTERNAL DEVICES — *1108*

CYCLE THROUGH PROCESS AT EACH TIME STEP — *1110*

RECONSTRUCT TEMPERATURE GRADIENT ALONG THE CURVE USING RECEIVED COEFFICIENTS — *1112*

FIG. 11

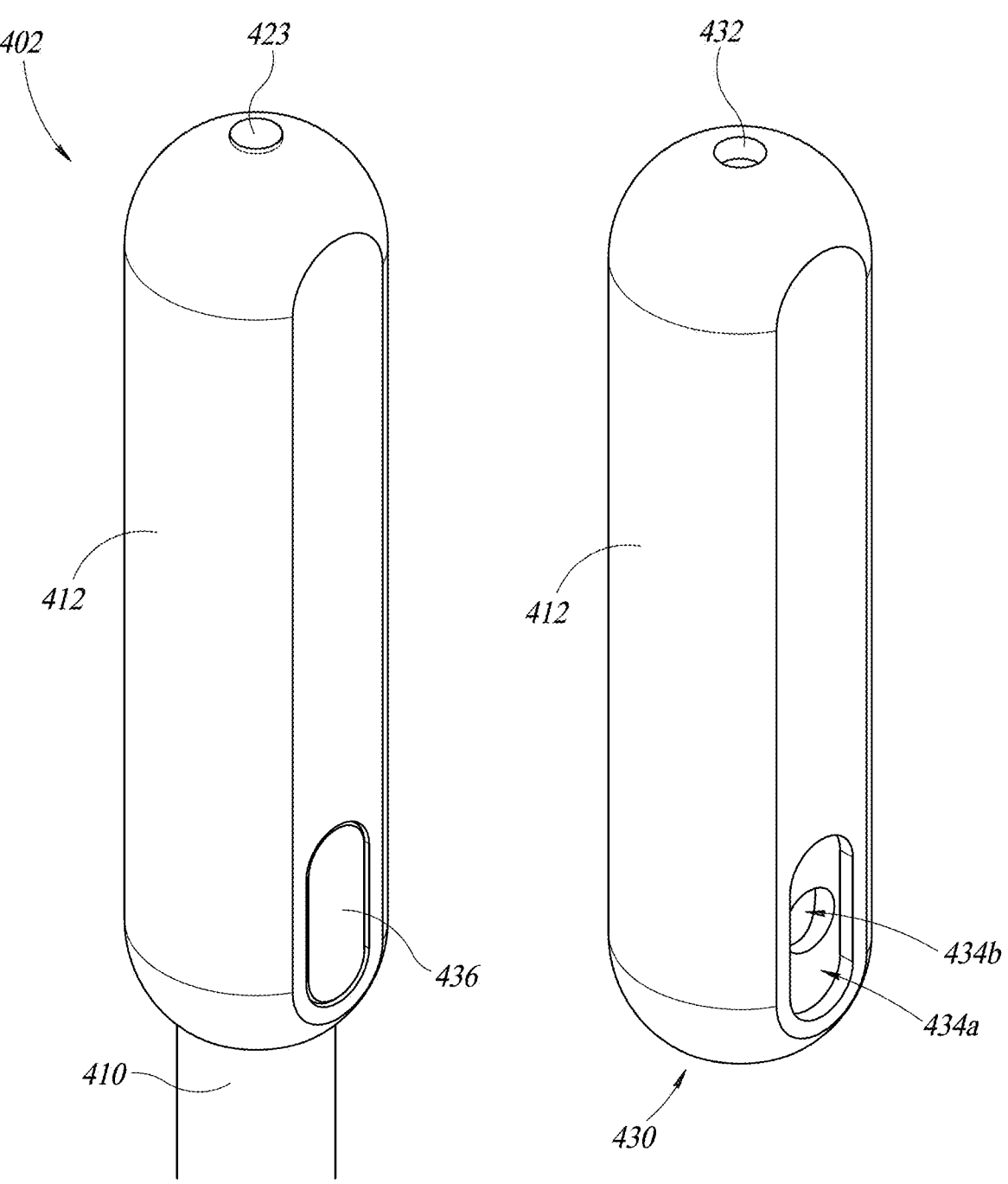
FIG. 27                    FIG. 28

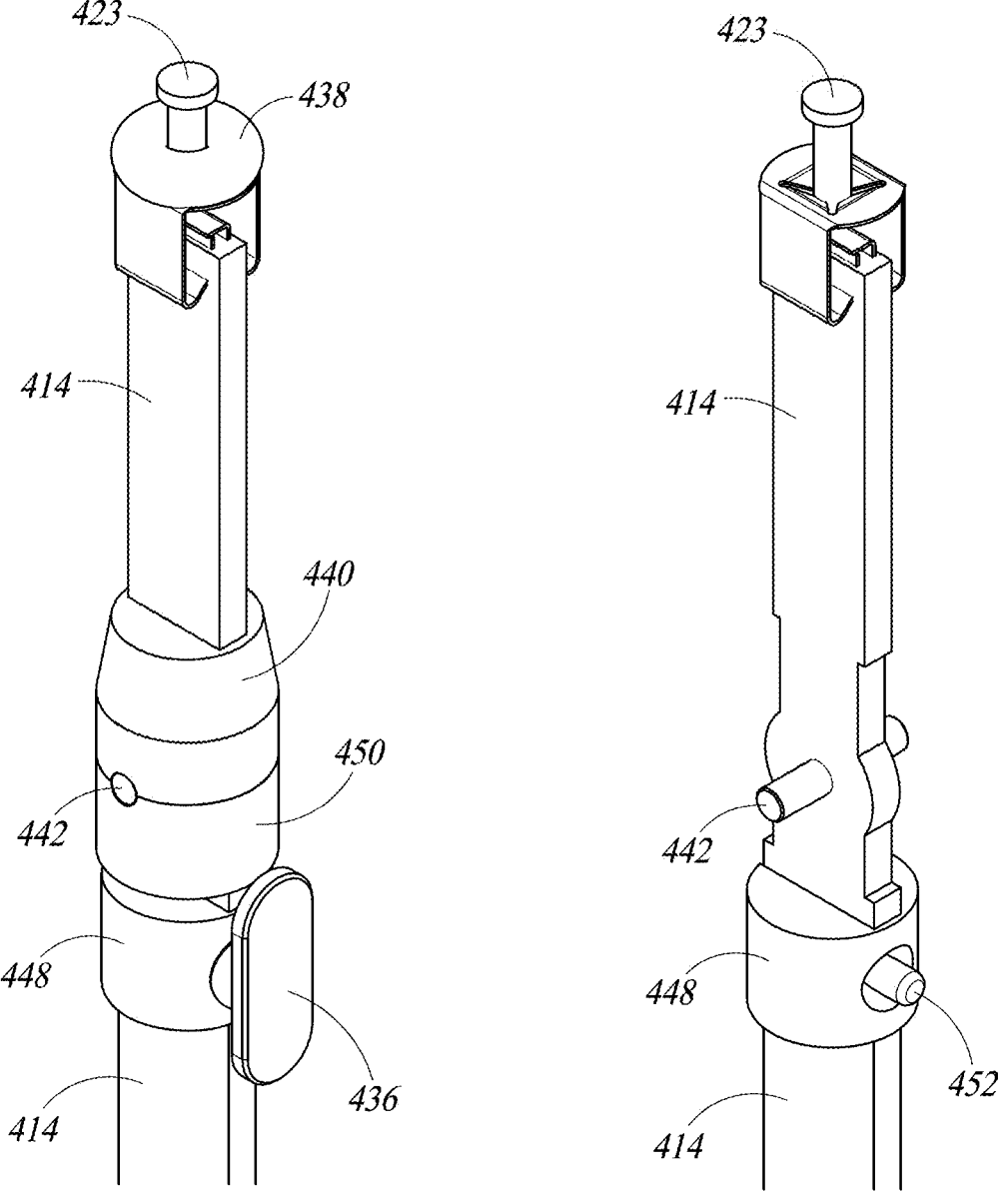
FIG. 31                    FIG. 32

WIRELESS MULTI-POINT FOOD THERMOMETER

BACKGROUND

Technical Field

The present disclosure relates to food thermometers and methods of cooking using food thermometers.

Description of the Related Art

A food thermometer, also known as a cooking thermometer or meat thermometer, is a thermometer used to measure the internal temperature of food, such as roasts, steaks, fillets, cutlets, or other cooked foods. The degree of "doneness" of food correlates closely with the internal temperature, so that a thermometer reading indicates when the food is cooked as desired.

Conventional food thermometers have a metal probe with a sharp point which is pushed into the food, and an analog dial or digital display that provides a temperature reading. Some food thermometers show the temperature only, while others also provide indications of when different kinds of food are done to a specified degree (e.g., "beef, medium rare"). Some food thermometers use a bimetallic strip which rotates a needle that shows the temperature on a dial, wherein the entire thermometer can be left inside the oven during cooking. Another variety commonly used on turkey is the pop-up timer, which uses a spring held in by a material that melts when the food reaches a set temperature and causes an indicator to "pop up." Bimetal coil thermometers and pop-up devices are low-accuracy and low-precision types of food thermometers and thus may not be trusted as a reliable food thermometer.

Other types of food thermometers use an electronic sensor in the probe, connected, such as by a heat-resistant cable, to a display. Depending on the nature of the electronic sensor, and the details of its implementation, a high-accuracy and high-precision food thermometer may be constructed. In some designs, the probe may be inserted in the food with a connecting cable that comes out of the cooking device (e.g., oven, grill, smoker) and is attached to the display. These types of food thermometers can be set to sound an alarm when the specified temperature is reached. Wireless types of food thermometers, where the display does not have to be close to the cooking device, are also available.

Food thermometers may include a single sensor or multiple sensors. Single sensor food thermometers can only monitor one region of the food at a time, e.g., the core temperature. Multi-sensor thermometers allow the user flexibility to monitor multiple temperatures simultaneously, such as the core-temperature of the food and the ambient cooking temperature. However, while existing thermometers can measure the temperature of cooking food to varying degrees of accuracy, they are unable to extrapolate from their measurements to answer the very common cooking question, "how long until the food will be done cooking?"

SUMMARY

A multi-point food thermometer, also referred to herein as a multi-sensor food thermometer, may be summarized as comprising: a metallic sensor tube that houses a plurality of temperature sensors; and a ceramic handle, wherein the ceramic handle is mechanically coupled to the metallic sensor tube.

A method of operating a multi-point food thermometer including a metallic sensor tube that houses a plurality of temperature sensors and a ceramic handle mechanically coupled to the metallic sensor tube may be summarized as comprising: inserting at least a portion of the metallic sensor tube into a piece of food to be cooked; and cooking the piece of food with the metallic sensor tube inserted into the piece of food.

A method of fabricating a multi-point food thermometer may be summarized as comprising: fabricating a metallic sensor tube; inserting a plurality of temperature sensors into the metallic sensor tube; fabricating a ceramic handle; and mechanically coupling the ceramic handle to the metallic sensor tube.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 10 is a diagram that illustrates communication between the temperature probe and one or more external devices, according to one non-limiting illustrated implementation.

FIG. 11 is a flow diagram for a process of recording temperature data by the temperature probe and transmission of the data to an external device.

FIG. 27 illustrates a handle region of a temperature probe.

FIG. 28 illustrates a handle of the temperature probe of FIG. 27.

FIG. 31 illustrates the handle region of the temperature probe of FIG. 27 with the handle of FIG. 28 and the sensor tube of FIG. 30 removed.

FIG. 32 illustrates some of the same components as FIG. 31 with other components removed.

DETAILED DESCRIPTION

Figure 1:
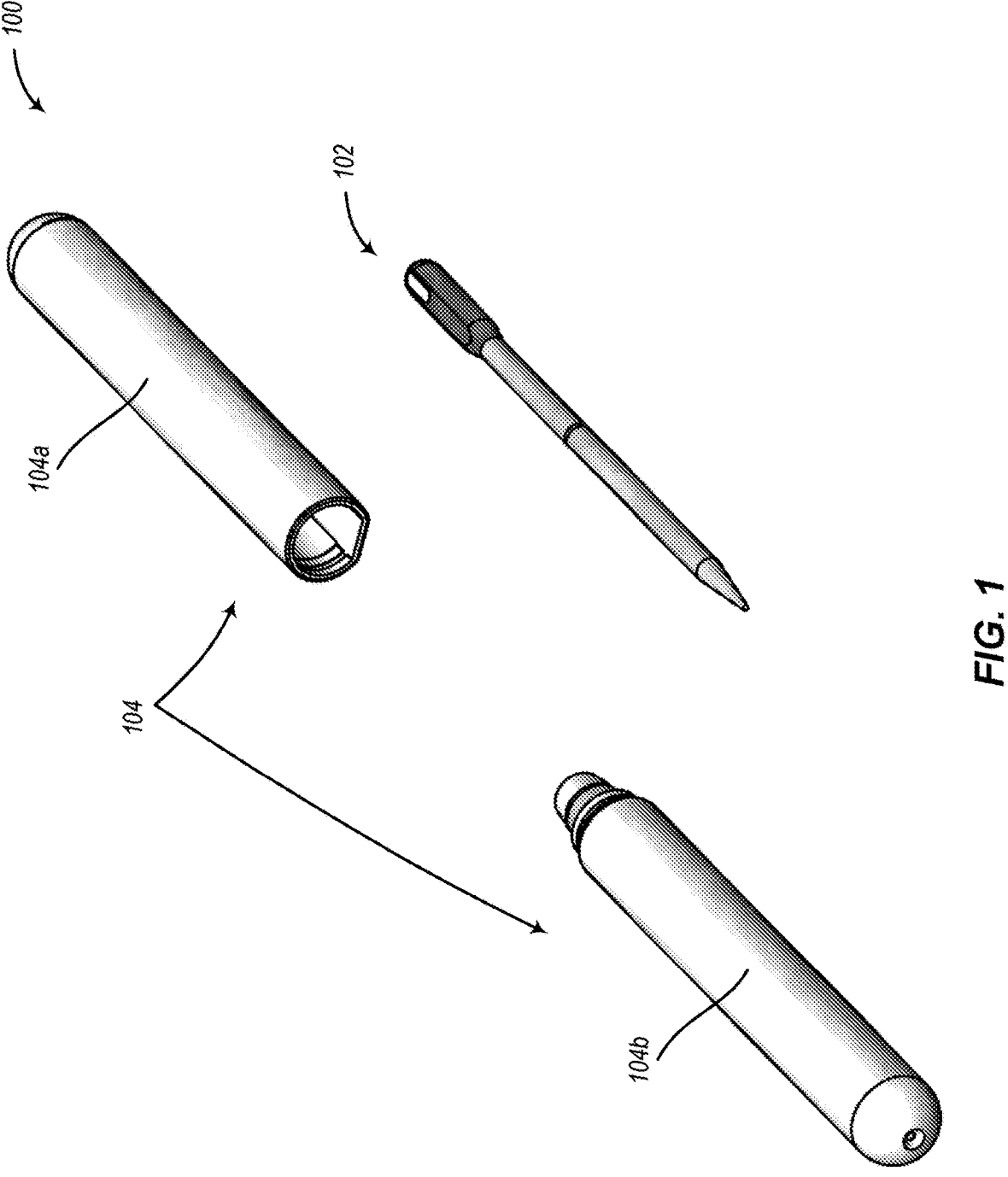
FIG. 1 is a perspective view of a food thermometer according to an embodiment of the present disclosure that includes a temperature probe and a charger case that houses the temperature probe and charges a power source of the temperature probe.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications net-works have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

With reference to FIGS. 1-9C, one or more implementations of the present disclosure relate to a wireless multi-point food thermometer 100, which is a kitchen tool designed to allow remote monitoring and, in at least some implementations, control of a cooking process. The food thermometer 100 of the present disclosure may include a temperature probe 102 and a charger case 104. In use, the temperature probe 102 may be inserted into food and then operates inside a high-temperature cooking environment such as an oven, stove top, deep fryer, slow cooker, sous vide bath, smoker, or grill.

Advantageously, the sensitive electronics and battery inside the temperature probe 102 are kept cool by the food itself by positioning these components toward the tip of the temperature probe, which is inserted into the food during cooking. This works because food is mostly water, and the boiling point of water is approximately 100° C. Therefore, the food is able to keep the part of the temperature probe 102 inserted into the food below 100° C. as long as it remains relatively moist, which is acceptable for appropriately selected electrical components, including a battery, radio, microprocessor, and temperature sensors, as discussed further below. A high-temperature region of the temperature probe 102, devoid of high-temperature sensitive electronics, extends from the food and contains high-temperature sensing components and an antenna that transmits measurements and other data via RF transmission, for example, using the Bluetooth Low Energy (LE) protocol or another suitable protocol.

In at least some implementations, the temperature probe 102 of the present disclosure may have one or more of the following advantageous features. The temperature probe 102 may include a linear array of temperature sensors 106 (see FIGS. 9A and 9B) that simultaneously measure multiple locations in the food, which enables it to estimate the spatial distribution of temperatures within the food. From these measurements, mathematical algorithms may be used to automatically estimate the locations and temperatures at both the core and the surface of the food, and/or to reconstruct the temperature gradient within the food. Further, because the actual position of the sensors 106 inside the temperature probe 102 is known, once the core and surface of the food are located relative to the sensor positions, the distance from the surface of the food to the core can be determined, providing a one dimensional (1-D) estimate of the characteristic size of the food being cooked.

It is noted that the sensors 106 in the linear array may not be uniformly spaced. As an example, the spacing of the sensors 106 may be designed to place more sensors in regions where more spatial resolution is desired, and fewer sensors in regions where the temperature is expected to be more uniform. In the example embodiment, the linear array includes eight sensors 106, although in other embodiments fewer or more sensors may be provided. Additionally, using mathematical algorithms, a curve may be fit to data from the array of multiple sensors 106, and a minimum temperature may be found along this curve to locate or estimate a lowest-temperature region of the food, commonly known as the core of the food. Further, using mathematical algorithms, the array of multiple sensors 106 may be used to determine the temperature of the surface of the food.

Additionally, mathematical functions, (e.g., finite or infinite impulse response filters, etc.), can be used to shorten the response time to changing temperature stimulus of one or more of the physical sensors within the probe to provide an "instant" reading of the sensors. While such algorithms are known to those skilled in the art, when a suitable curve is fit to the output of these of these functions, the resulting function describes the response of the entire temperature profile along the probe, rather than an individual sensor. This affords a valuable means of providing an "instant" reading anywhere along the sensor tube, such as of a true core temperature, irrespective of some mis-positioning of the probe's tip relative to the location of the core.

One or more additional sensors not buried inside the food during operation may be used to measure the surrounding ambient temperature during cooking. In at least some implementations, at least one sensor is dedicated to measuring the ambient temperature outside the food, even if the temperature probe is fully inserted, and this sensor is considered a known ambient temperature sensor.

During most cooking processes, food undergoes evaporative cooling, and the true cooking temperature of the food becomes dependent on the humidity of the cooking environment and the wetness of the food's surface, as well as the ambient cooking temperature. Because the surface temperature may be directly measured using the temperature probe 102 of the present disclosure, the true cooking temperature at the surface of the food is known and may be used by the end user or by devices in communication with the temperature probe to account for evaporative cooling effects and accurately control the true cooking temperature at the surface of the food, including as environmental conditions change. That is, the measured, determined, and/or calculated surface temperature of the food being cooked can be used as a key input in operation of a cooking device, either by a human operator or by a programmed control algorithm, such as in controlling a heating element to increase, decrease, or maintain an ambient temperature surrounding the food being cooked.

Further, because the position of the sensors 106 inside the temperature probe 102 is known, the distance from the surface of the food to the core can be estimated, providing a one dimensional (1-D) estimate of the characteristic size of the food being cooked. This information, along with time series data from the array of temperature sensors 106 in the probe 102, may be used by one or more machine learning classification algorithms (e.g., hidden Markov model, long-short term memory, k-nearest neighbor, naïve Bayes, support vector machines, etc.) to further estimate the characteristic geometric shape of the food (e.g., approximately slab-shaped, cylindrical-shaped, spherical-shaped, or in-between shapes), the nature of the cooking environment (oven-roasting, grilling, smoking, etc.), the effective thermal diffusivity of the food, the effective heat transfer rate at the surface of the food, and the effective humidity of the cooking environment.

These estimated parameters allow the governing physical equation (a form of the heat equation) to be solved, or approximately solved, and thereby make a prediction about the cooking time required for the food to reach a set-point. The governing equation may also be solved for an estimate of the temperature rise that will occur within the food during "resting" after the cooking has stopped, as well as an estimate for and the time required for this rise to occur. This estimate of resting temperature rise may be subtracted from the set-point to find a new set-point temperature for the food that is when cooking should be halted and resting should begin, and this new set-point temperature may then be used to make a prediction of the total cooking time remaining. The addition of cooking time remaining with the estimate of the resting time result in the total time remaining.

In at least some implementations, to minimize the complexity of interfacing with the temperature probe 102, and to eliminate the requirement for two-way communication between the probe and a device (e.g., cooking device, computing system) in communication with the probe, the temperature probe may reduce the data broadcast over RF by advertising only the coefficients that describe a curve that fits the sensor data for sensors inside the food, together with data not captured by the curve, such as the ambient temperature data captured by one or more sensors outside the food. An example approach for this functionality is described below, with reference to a method 1100 shown in FIG. 11.

At 1102, control circuitry of the temperature probe 102 may advertise a single-tip sensor measurement, such as a measurement from a high-accuracy integrated circuit (IC) sensor, and the ambient sensor measurement obtained from a sensor that is positioned on the temperature probe 102 at a location where it remains outside the food when the tip of the temperature probe is inserted into food. This data may be usable in a peculiar case when the user is simply trying to use the temperature probe 102 as an instant-read thermometer.

At 1104, the control circuitry of the temperature probe 102 may identify the likely location of the surface transition for the food. As an example, the surface transition may be the transition from air into the food (solid or liquid). One approach is to calculate a temperature difference ($\Delta T$) between each sensor and a known ambient sensor, and compare the absolute value of the $\Delta T$ to a threshold value. If the absolute value of the temperature difference for a given sensor is less than the threshold value, then the sensor is near ambient temperature and the sensor is not inside the food. If the absolute value of the temperature difference for a sensor is greater than the threshold, then the control circuitry determines that the particular sensor is inside the food. Another approach is to calculate a difference between the rate of change for each sensor and the rate of change for a known ambient sensor ($\Delta dT$), and compare the absolute value of $\Delta dT$ to a threshold value. If the absolute value of $\Delta dT$ for a given sensor is less than the threshold value, then the sensor is not inside the food. If the absolute value of $\Delta dT$ for a given sensor is greater than the threshold, then the control circuitry determines that the particular sensor is inside the food. The control circuitry may find the neighboring sensor pair where one is inside the food and one is outside of the food. The sensor determined to be inside the food that is adjacent to a sensor determined to be outside of the food may be considered the sensor at or near the surface of the food.

At 1106, the control circuitry may optionally fit a curve to the sensor data of the sensors 106 determined to be inside the food. As an example, the control circuitry may utilize a polynomial linear regression fit or other curve-fitting algorithm. Once the curve is determined, at 1108 the control circuitry may start advertising the parameters of the curve, along with the ambient temperature measurement. It is noted that, in at least some implementations, the control circuitry may perform a more computationally involved nonlinear fitting with exponentials because such fitting can be described with fewer parameters, and therefore the control circuitry can advertise less data, achieving a net power savings. In other implementations, the control circuitry may advertise the parameters necessary for the governing equation (a form of the heat equation) to be solved, and allow the temperature at any time or location to be computed. In at least some implementations, rather than fitting a curve, the control circuitry may simply advertise all of the sensors' actual temperature measurements, and external control circuitry (e.g., mobile app executing on a smart phone or tablet) that receives the data may perform various processing algorithms. In general, the processing, analysis, or use of the data may be performed by several devices, including the probe, application, the cloud, or any combinations thereof.

At 1110, on each time step, the control circuitry may cycle through this process again. If the control circuitry determines that the sensor determined to be the surface sensor has changed (e.g., due to movement of the probe relative to the food), then the control circuitry may create a new best fit curve. Movement of the sensor may occur if the user moves the probe, or movement may occur due to shrinking of the food during cooking. If the sensor that was determined to be the surface sensor has not changed, the control circuitry may update the curve parameters using updated temperature measurements and advertise the parameters along with the ambient sensor measurement. In some implementations, the control circuitry may update the curve parameters with smoothing, e.g., using a rolling average, to keep the curve from varying greatly between time steps.

At 1112, an application receiving the advertisements from the temperature probe may reconstruct the temperature gradient along the curve and render it. The application may be executing on any device, such as a cooking device, computing system (e.g., smartphone, tablet), cloud based device, etc., and may be operative to control the cooking device using the received temperature data, and/or to present data to the user. The application may look for the minimum value and the location along the curve to determine the "core" temperature of the food. The application may use the extreme end of the curve as the "surface" temperature, as noted above, and may also display the advertised ambient temperature.

In at least some implementations, the temperature probe 102 of the present disclosure may automatically turn on and automatically turn off. To meet various design constraints, such as size, weight, cost and performance, the temperature probe 102 may a very limited battery life and no physical buttons. Therefore, in such implementations it is advantageous for the probe to carefully manage when it is active and consuming power.

Thus, in at least some implementations, the temperature probe 102 may operate in a low-power state and an active or fully on state. In the low-power state, the probe may measure a fast-responding sensor positioned at the tip of the temperature probe, as well as a slow-responding ambient sensor positioned at the end opposite the tip. If the ambient sensor temperature is greater than a threshold temperature (e.g., 50° C.), the control circuitry of the probe may determine that the probe is inside food and may cause the probe to go into the active state. If the ambient sensor temperature is less than the threshold temperature, a temperature difference may be calculated between these two values and stored. On the next time step (e.g., 200 ms, 500 ms, 1 second, 5 seconds), the temperature difference may be recalculated and compared to the previous value. If the absolute difference is greater than a threshold value, the control circuitry may transition the probe to the active state. If the absolute difference is less than the threshold value, the probe remains in a low-power state.

At each time step, a temperature difference may be calculated between the ambient temperature sensor and the tip sensor (i.e., the sensor positioned at the tip of the probe). If the temperature difference is above a threshold value, then the probe remains in an active state. If the temperature difference is below the threshold value, the probe may then test whether the ambient sensor temperature is above a threshold temperature (e.g., 50° C.). If the ambient sensor temperature is above the threshold temperature, then the probe remains in an active state. If the ambient sensor temperature is at or below the threshold temperature, the probe may be transitioned to the low-power state.

In at least some implementations, the control circuitry may detect when a battery of the probe is being charged. If the control circuitry detects current flowing to the battery, the probe may stop transmitting since the control circuitry determines the temperature probe is not currently inside food because the probe is charging.

In at least some implementations, the temperature probe 102 may be auto-calibrated. For example, to reduce cost or for other benefits, the temperature probe 102 may use a combination of relatively low-accuracy and relatively high-accuracy temperature sensors, such as thermistors or integrated circuit temperature sensors (IC sensors), respectively. In at least some implementations, one high-accuracy, high-interchangeability IC sensor is included in the tip of the probe. Under certain conditions, the probe may use the IC sensor to update calibration coefficients for the other, lower-accuracy sensors, as discussed further below.

In at least some implementations, the probe 102 may be stored in the insulated charger case 104 that keeps the probe tip relatively isothermal. Because in at least some implementations the probe tip uses integrated circuits (ICs) rather than thermistors, the control circuitry may rely on the linearity of the IC sensors and simply calculate offsets from the high-accuracy sensor and store these to be used in the future. In such implementations, the output from the thermistors may be ignored because ±1° C. accuracy may be adequate at the surface of food and for ambient temperature.

In at least some implementations, to calibrate the temperature probe 102, the probe may be placed horizontally in a pot of water and brought to a boil and then let cool. During the temperature ramp up and down periods, the probe 102 may store the measurements for each time step. At the end of the calibration cycle, the average offsets for each IC sensor may be calculated and stored, and a polynomial may be fit (e.g., using linear regression) for each thermistor to generate and update the coefficients (e.g., Steinhart-Hart coefficients) used to convert each thermistor voltage measurement into a temperature measurement.

The temperature probes 102 of the present disclosure may have a simplified construction. It is important to have good thermal contact between the sensors 106 and the sensor tube or tip 110 that houses the sensors. This provides a faster response time and a more accurate measurement of the temperature locally in contact with the outside of the sensor tube. In many designs, various conductive devices such as springs or metal tabs are used to create a good thermal path between the sensor tube 110 and the sensor 106 located on a circuit board. In at least some implementations of the present disclosure, one or more of the sensors 106 are positioned on a flexible circuit strip 115, which is positioned on top of a compressible foam core 116 that is slightly oversized for the sensor tube or tip 110. When this assembly is packed into the sensor tube 110 during assembly, the foam 116 is compressed and forces the flexible circuit board 115, and the sensors 106 populating it, firmly against the wall of the sensor tube 110 in highly repeatable way. With the application of a small amount of thermally conductive grease to the inside of the sensor tube 110, this provides a low-cost, and highly-repeatable, low-impedance thermal path between the sensor tube 110 and the sensors 106 themselves and without the need for a bridging component, which is required for prior designs.

As discussed elsewhere herein, the temperature probe 102 includes an RF antenna 117 used to transmit data to other devices (e.g., cooking device, mobile computers, servers, etc.). There are multiple ways to etch an RF antenna trace directly on the printed circuit board assembly (PCBA) 114 in the high-temperature region of the probe (i.e., the portion opposite the tip that remains outside of the food during use). It is desirable to keep most other conductive elements far away from the antenna 117 itself to avoid interference and to provide a strong signal. However, given the consumer desire for a very small probe and handle, this creates a challenge in the design of the temperature probe 102.

In at least some implementations, the sensor tube 110 itself may act as the neutral or negative terminal when charging, and another metal contact 123 in the handle region may act as the positive terminal. This may require routing a circuit trace in close proximity to the antenna, as well as positioning a relatively large piece of metal that acts as a contact point in a charger. This results in reduced antenna performance, as discussed above.

Advantageously, in at least some implementations, the antenna trace 117 itself may be used as the positive trace during charging. Because the antenna 117 is not used for transmission while the temperature probe 102 is recharging, a suitable circuit may be placed on the feedline between the radio 150 and the antenna 117 so that current flowing during charging will not reach the radio, but instead will be rerouted to flow to the battery 121 to charge the battery 121.

Figure 34:
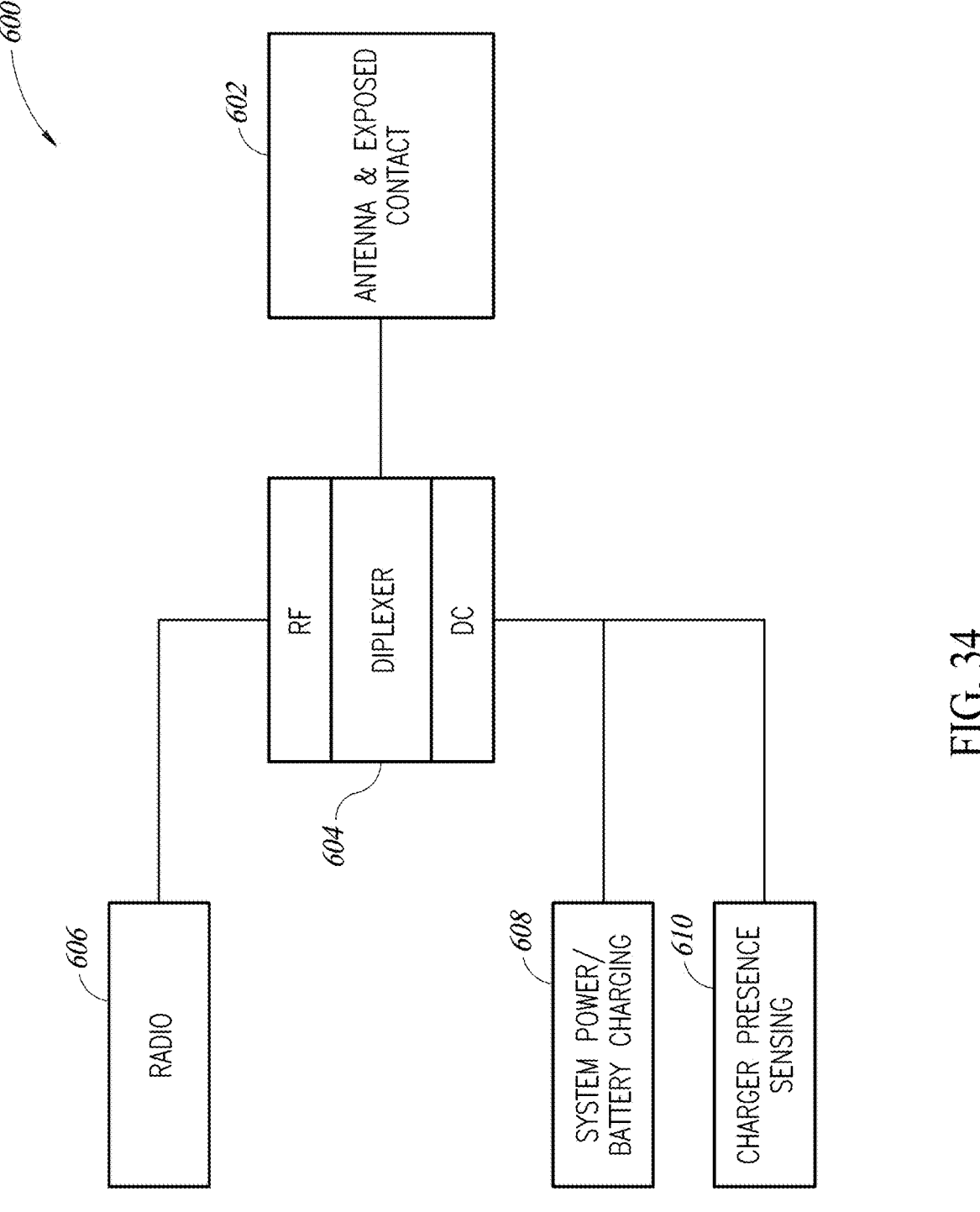
FIG. 34 is a schematic block diagram of a dual-purpose antenna and charging system for a temperature probe according to one or more embodiments of the present disclosure.
Figure 35:
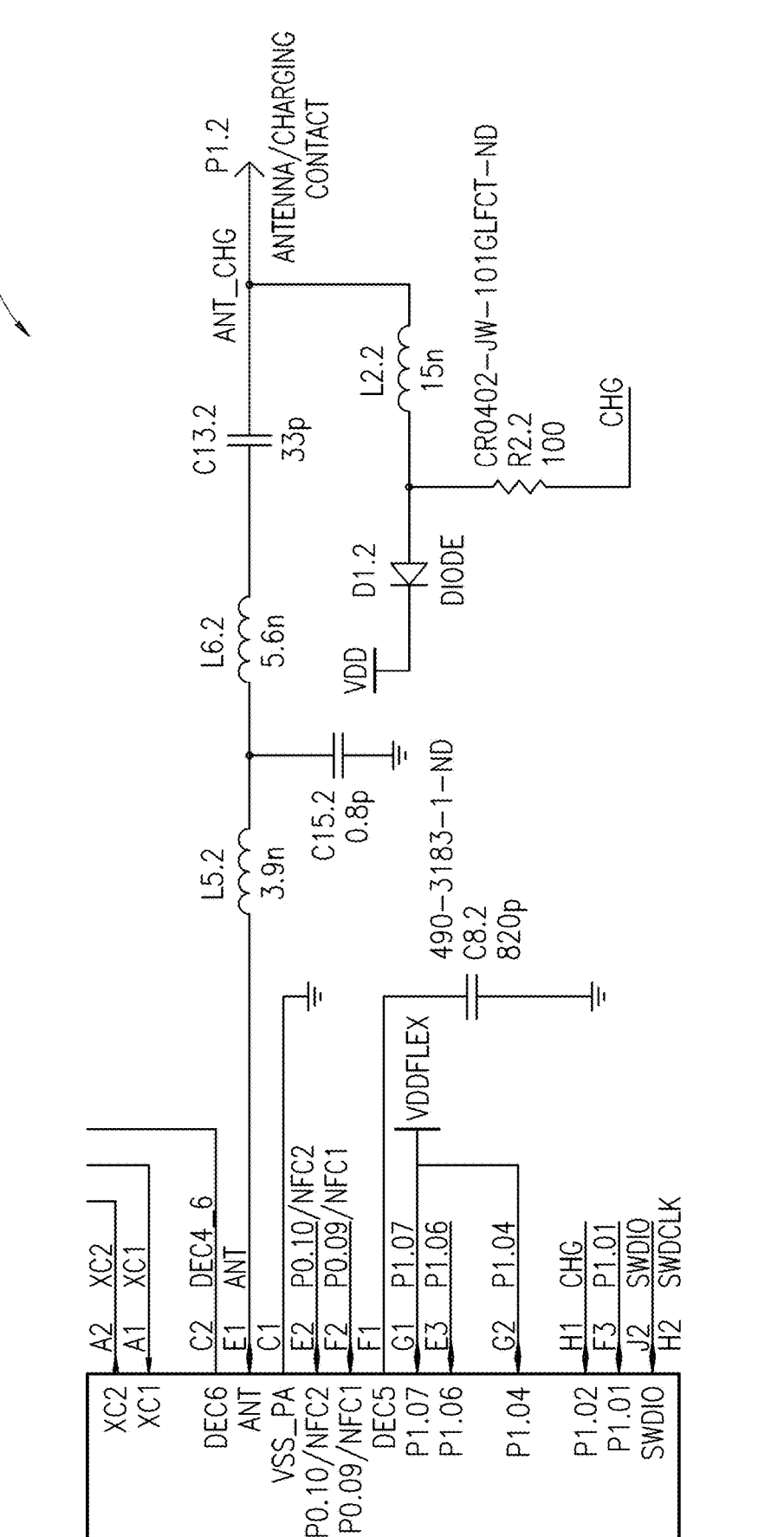
FIG. 35 is a circuit diagram showing an example implementation of the dual-purpose antenna and charging system of FIG. 34.

FIG. 34 is a schematic block diagram of a dual-purpose antenna and charging system 600 for a temperature probe, according to one or more embodiments of the present disclosure. The system 600 may be included in any of the embodiments discussed herein. FIG. 35 is an example circuit diagram 650 showing portions of the dual-purpose antenna and charging system 600 of FIG. 34 according to one example implementation. The dual-purpose antenna/charging system 600 includes an antenna and exposed contact 602, a diplexer 604 comprising an RF path and a DC path, a radio 606, a system power and/or battery charging rail 608, and charger presence sensing circuitry 610. Each of these components is discussed further below.

The antenna 602 includes an exposed electrical contact that carries both DC and RF currents. The diplexer 604 includes a capacitor C13.2 and an inductor L2.2, and is operative to split/combine DC and RF currents, and may include a current path with specified (low) impedance at the RF frequency of interest and high impedance at DC. In one or more embodiments, this is achieved using the series capacitor C13.2 (FIG. 35) matched to the feed impedance at 2.4 GHz (e.g., matched to 50 ohms). In at least some implementations, the capacitor C13.2 may have a value of 33 pF. The diplexer 604 also includes a current path with low impedance at DC and high impedance at the RF frequency of interest. In at least some implementations, this is achieved using the series inductor L2.2, which in some implementations may have a value of 15 nH. In FIG. 35, the node P1.2 is the antenna/exposed contact 602, VDD is the system power and battery charging voltage, and ANT is the radio connection (e.g., connection to the ANT pin of an nRF52832 radio).

On the system side of the diplexer 604, the antenna current is split into RF and DC components. On the antenna side of the diplexer, the RF and DC currents are superposed.

The radio 606 is connected to the RF current path of the diplexer 604. Optionally, the radio 606 may include RF matching components. In at least some implementations, the radio 606 includes a 2.4 GHz radio, such as an nRF52832 Bluetooth® radio offered by Nordic Semiconductor, as well as matching components specified by Nordic Semiconductor. The matching components may include inductors L5.2 and L6.2, and capacitor C15.2.

The system power and/or battery charging rail 608 (VDD) is connected to the diplexer's DC current path. Optionally, a diode D1.2 is connected in series with the DC current path to prevent current flow from the system power rail/battery 608 to the exposed contact of the antenna 602. Optionally, the charging presence sensing circuitry 610 may be included in addition to the series diode D1.2 to detect when a DC current source is connected to the antenna's exposed contact. In at least some implementations, a series resistor R2.2 is connected between the diplexer's DC current path and a microcontroller GPIO (not shown, node labeled "CHG") to detect when a DC current source is attached. This DC rail VDD is used to power the system and to charge the integral battery. The series diode D1.2 is present to prevent battery discharge via the exposed contact of the antenna 602.

The system 600 also includes a return path for DC current flowing into the system via the exposed contact (e.g., an exposed ground contact). This path does not flow through the diplexer or antenna. In at least some implementations, this path is the probe shaft which is connected to system ground (GND), which allows the antenna 602 to be driven with an RF current by the radio 606 while a DC voltage is applied to the exposed contact in order to power and/or charge the system.

The high DC impedance and matched RF impedance presented by the RF path of the diplexer 604 allows the radio 606 to drive the antenna 602 without damage due to the applied DC voltage. The low DC impedance and high RF impedance presented by the DC path of the diplexer 604 allows the applied DC voltage and resulting DC current to reach the system without damage or compromised signal integrity due to the driven RF signal. In at least some implementations, the charger presence sensing circuitry 610 is used to disable the radio 606 when a charger is connected, though the radio can still function in this scenario.

FIG. 1 is a perspective view of the food thermometer 100 that includes the temperature probe 102 and the charger case 104 that houses the temperature probe for storage and for charging the battery 121 of the temperature probe 102. The charger case 104 includes an upper portion 104a and a lower portion 104b that is selectively coupleable to the upper portion 104a.

Figures 2A, 2B, 2C, 2D:
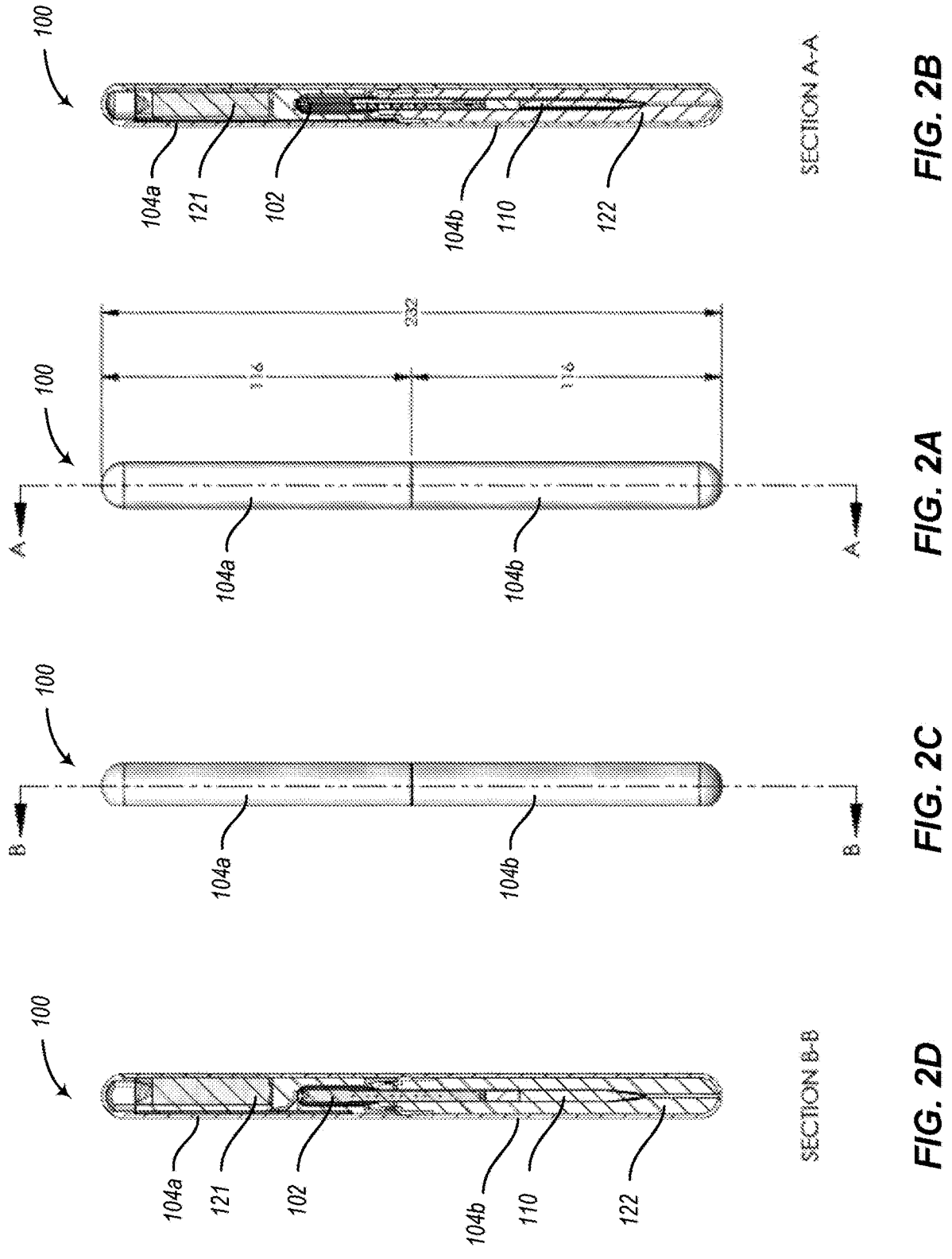
FIG. 2A is a first side elevational view of the food thermometer of FIG. 1 with the temperature probe positioned inside the charger case.
FIG. 2B is a sectional view of the food thermometer taken along the line A-A of FIG. 2A.
FIG. 2C is a second side elevational view of the food thermometer with the temperature probe positioned inside the charger case.
FIG. 2D is a sectional view of the food thermometer taken along the line B-B of FIG. 2C.

FIG. 2A is a first side elevational view of the food thermometer 100 with the temperature probe 102 positioned inside the charger case 104. FIG. 2B is a sectional view of the food thermometer 100 taken along the line A-A of FIG. 2A. FIG. 2C is a second side elevational view of the food thermometer 100 with the temperature probe 102 positioned inside the charger case 104. FIG. 2D is a sectional view of the food thermometer 100 taken along the line B-B of FIG. 2C.

Figure 3:
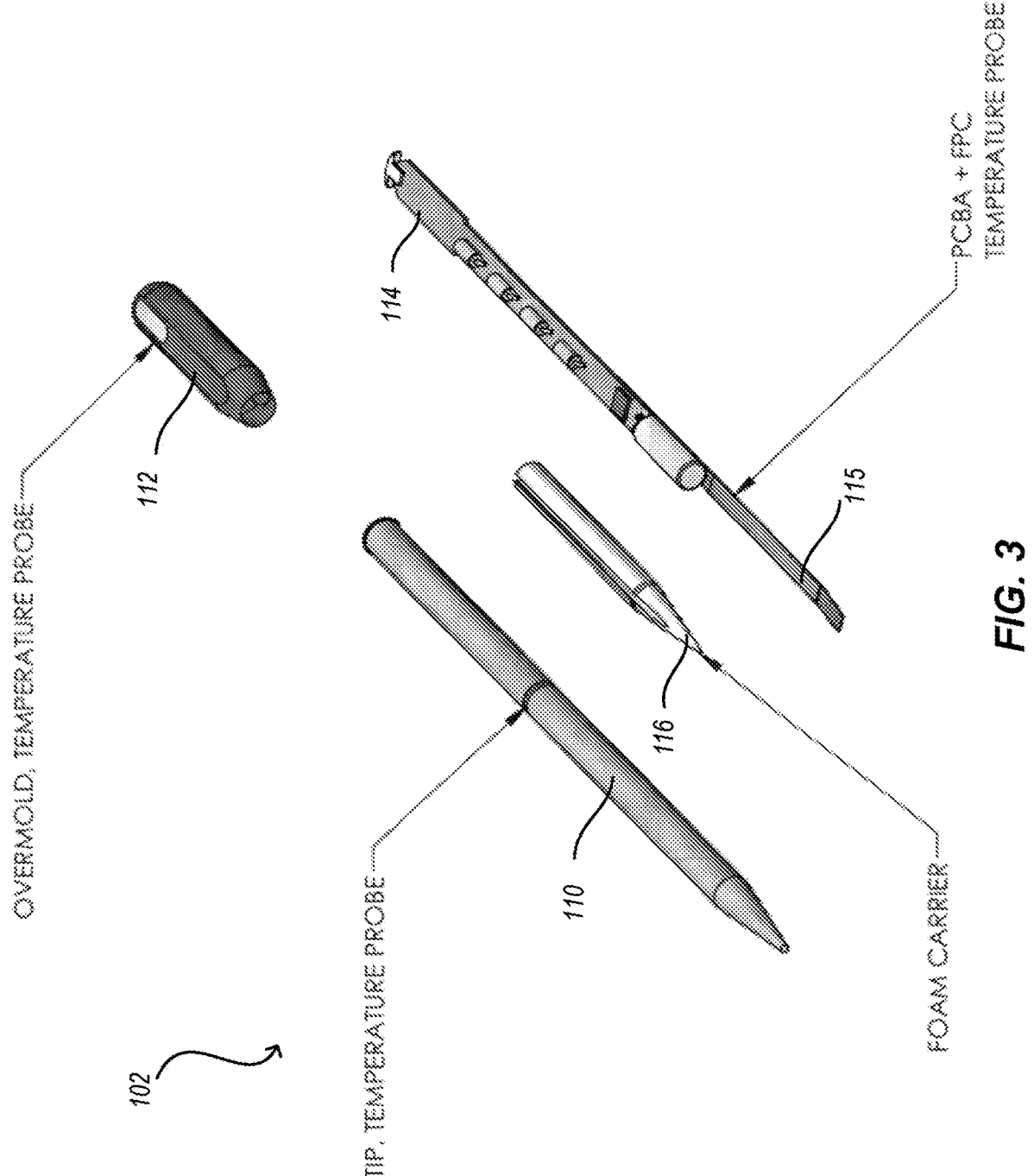
FIG. 3 is an exploded view of the temperature probe shown in FIG. 1, according to one non-limiting illustrated implementation.
Figures 4A, 4B, 4C, 4D:
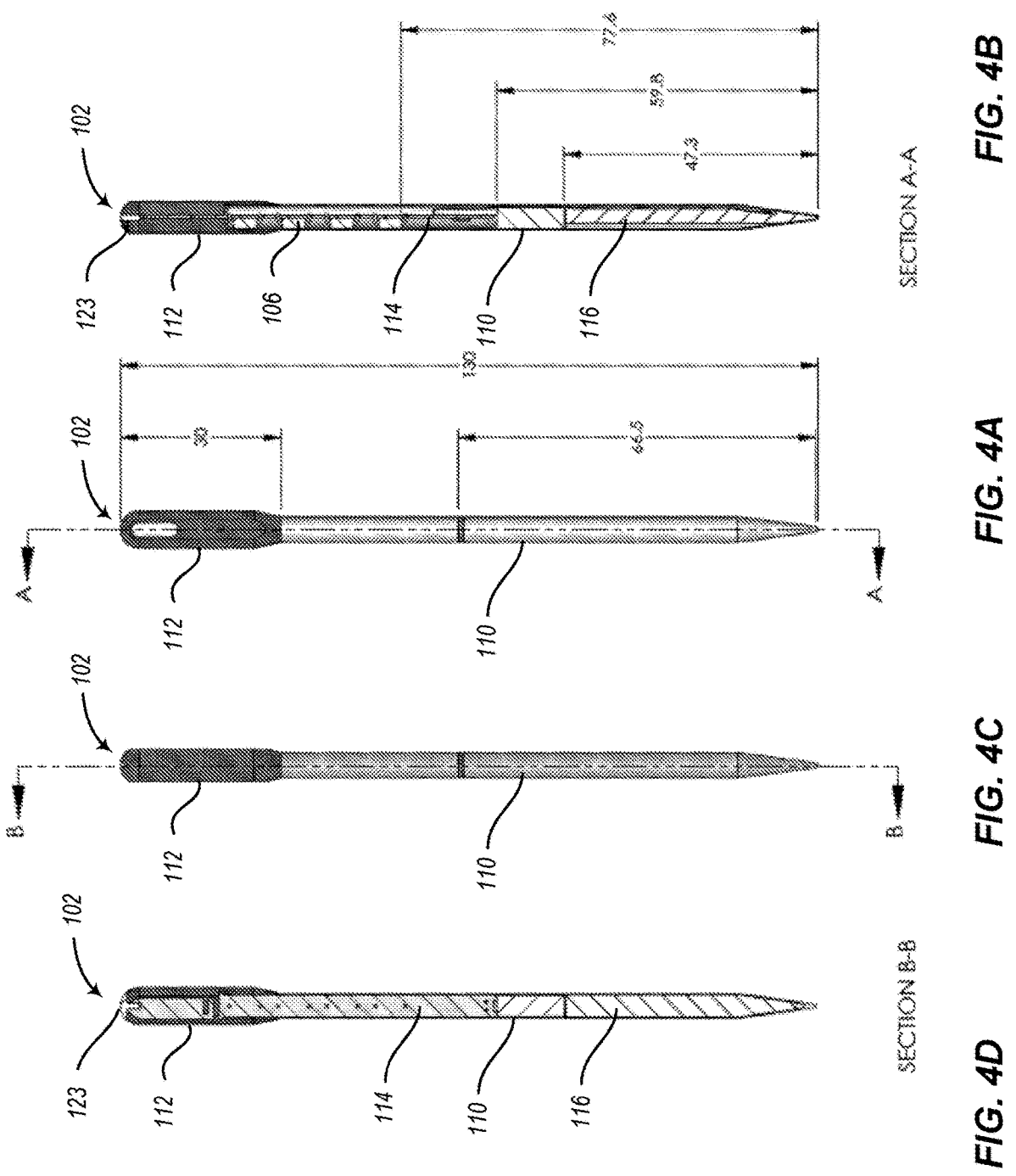
FIG. 4A is a first side elevational view of the temperature probe.
FIG. 4B is a sectional view of the temperature probe taken along the line A-A of FIG. 4A.
FIG. 4C is a second side elevational view of the temperature probe.
FIG. 4D is a sectional view of the temperature probe taken along the line B-B of FIG. 4C.

FIG. 3 is an exploded view of the temperature probe 102 shown in FIG. 1, according to one non-limiting illustrated implementation. The temperature probe 102 includes a sensor tube or tip 110, an overmold 112, printed circuit board assembly (PCBA) 114 and flexible printed circuit (FPC) 115, a foam carrier 116 positionable inside the tip 110 that houses the PCBA 114 and FPC 115, and a charging contact 123. FIG. 4A is a first side elevational view of the temperature probe 102. FIG. 4B is a sectional view of the temperature probe 102 taken along the line A-A of FIG. 4A. FIG. 4C is a second side elevational view of the temperature probe 102. FIG. 4D is a sectional view of the temperature probe 102 taken along the line B-B of FIG. 4C.

Figure 5:
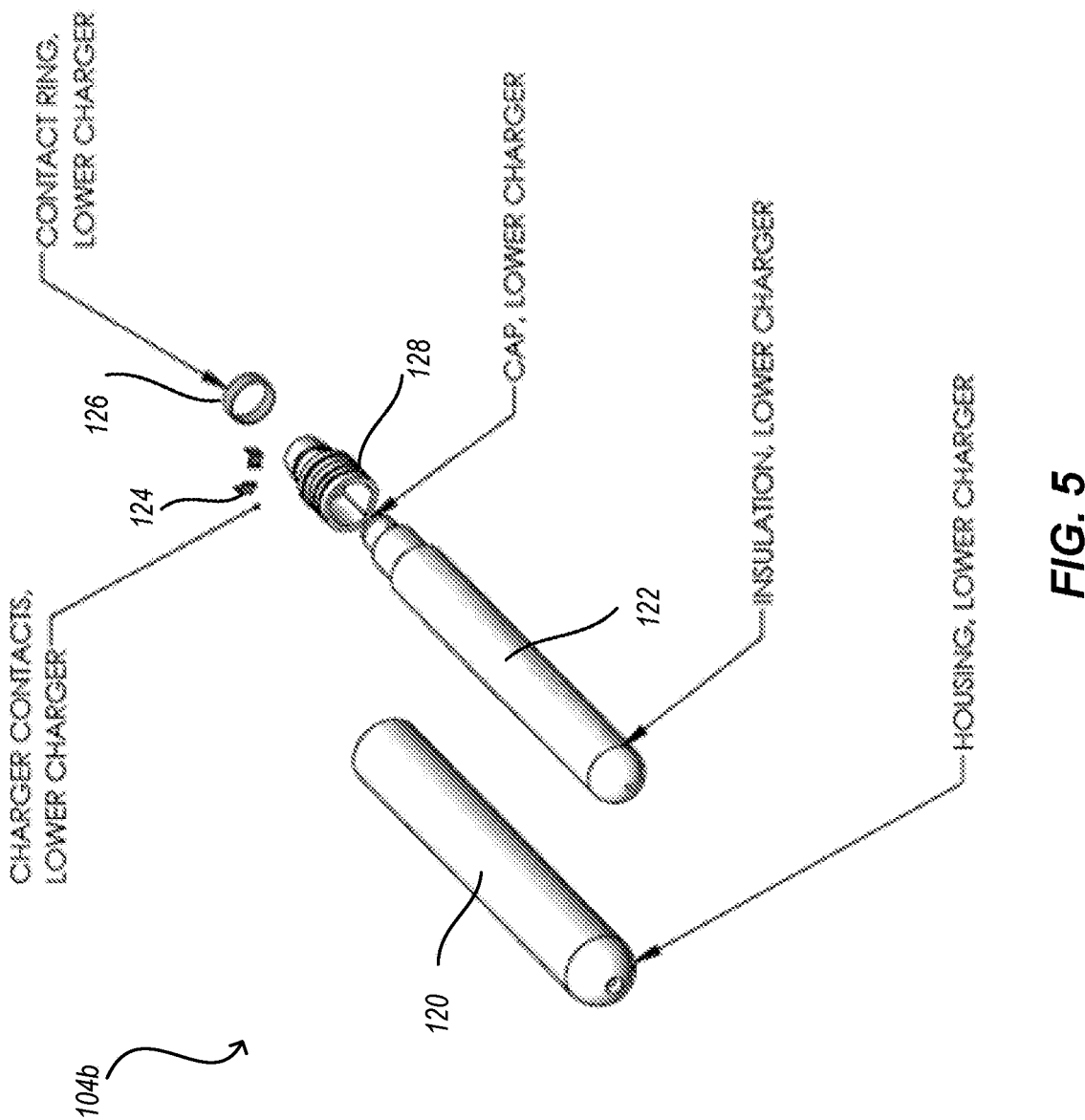
FIG. 5 is an exploded view of a lower portion of the charger case shown in FIG. 1, according to one non-limiting illustrated implementation.
Figures 6A, 6B, 6C, 6D:
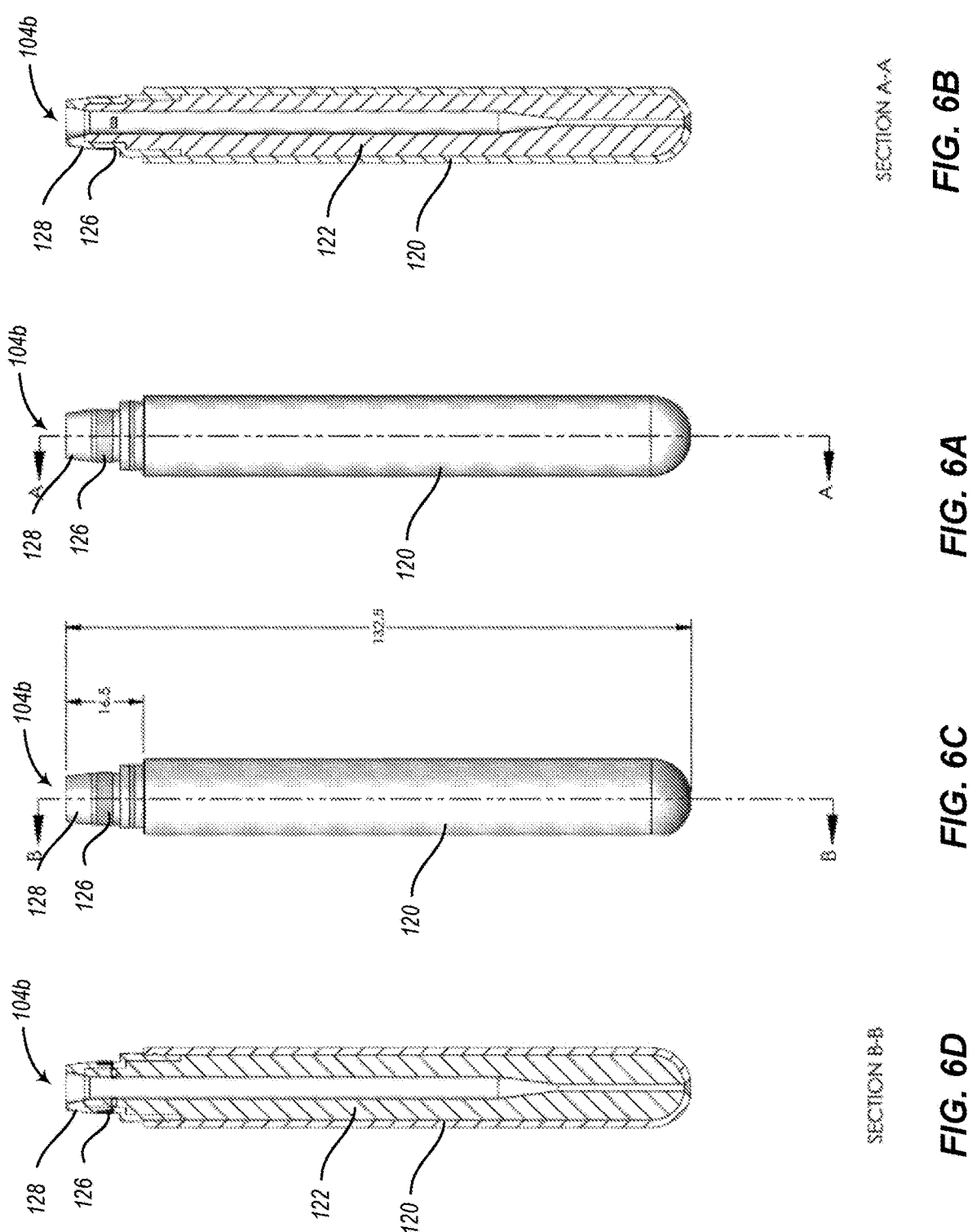
FIG. 6A is a first side elevational view of the lower portion of the charger case.
FIG. 6B is a sectional view of the lower portion of the charger case taken along the line A-A of FIG. 6A.
FIG. 6C is a second side elevational view of the lower portion of the charger case.
FIG. 6D is a sectional view of the lower portion of the charger case taken along the line B-B of FIG. 6C.

FIG. 5 is an exploded view of the lower portion 104b of the charger case 104 shown in FIG. 1, according to one non-limiting illustrated implementation. The lower portion 104b of the charger case 104 includes a housing 120, insulation 122, charger contacts 124, a contact ring 126, and a cap 128. FIG. 6A is a first side elevational view of the lower portion 104b of the charger case 104. FIG. 6B is a sectional view of the lower portion 104b of the charger case 104 taken along the line A-A of FIG. 6A. FIG. 6C is a second side elevational view of the lower portion 104b of the charger case 104. FIG. 6D is a sectional view of the lower portion 104b of the charger case 104 taken along the line B-B of FIG. 6C.

Figure 7:
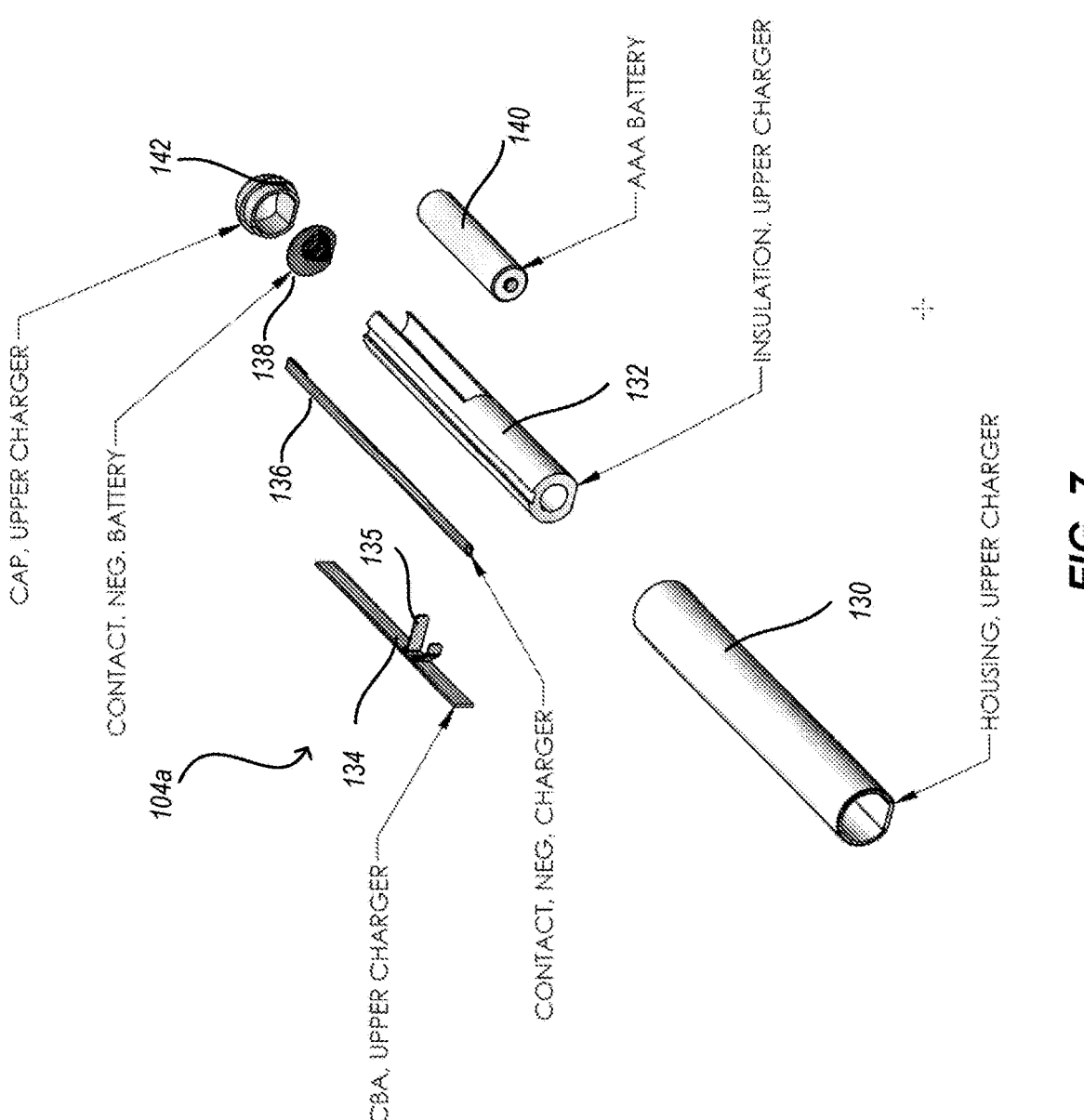
FIG. 7 is an exploded view of an upper portion of the charger case, according to one non-limiting illustrated implementation.
Figures 8A, 8B, 8C, 8D:
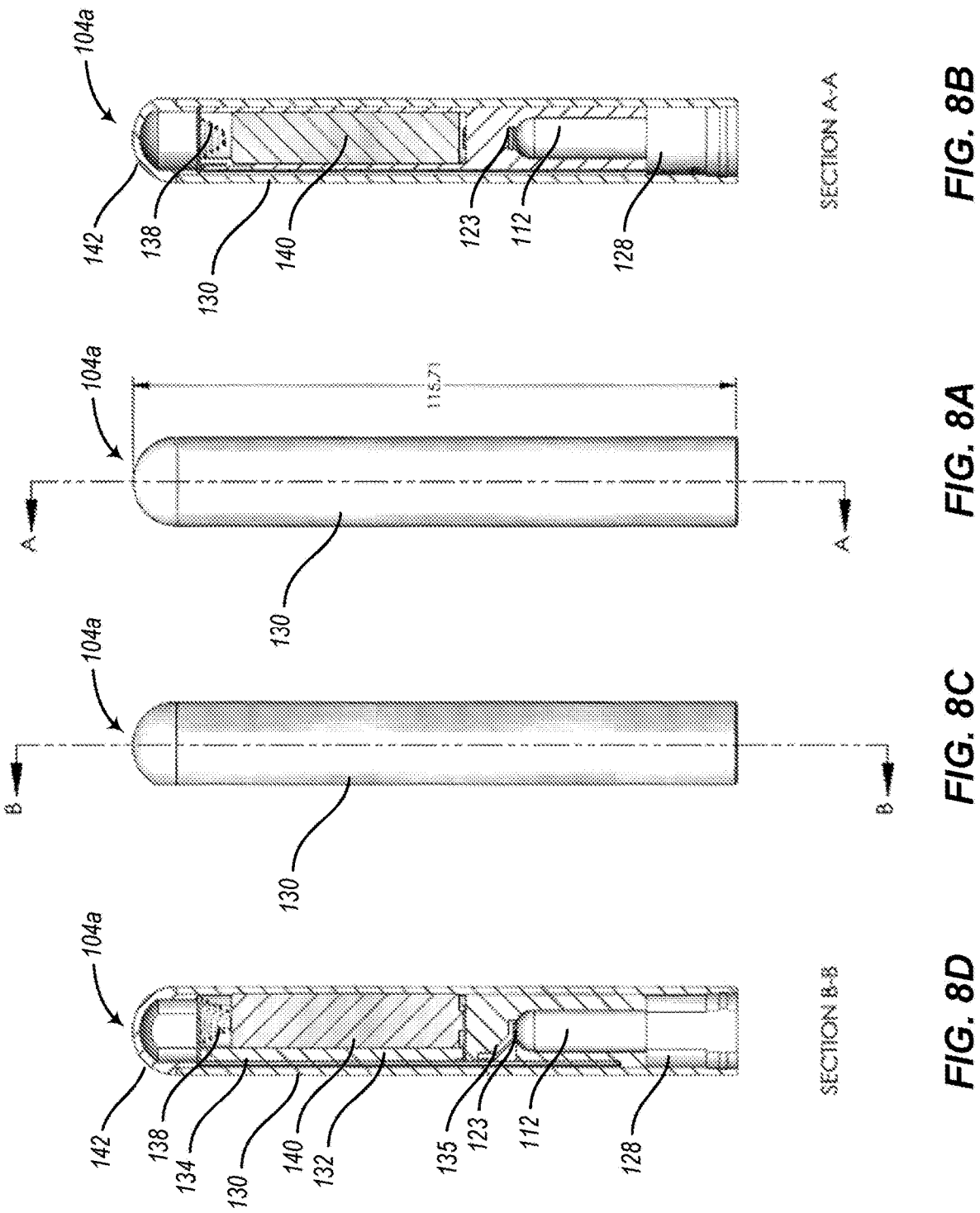
FIG. 8A is a first side elevational view of the upper portion of the charger case.
FIG. 8B is a sectional view of the upper portion of the charger case taken along the line A-A of FIG. 8A.
FIG. 8C is a second side elevational view of the upper portion of the charger case.
FIG. 8D is a sectional view of the upper portion of the charger case taken along the line B-B of FIG. 8C.

FIG. 7 is an exploded view of the upper portion 104a of the charger case 104, according to one non-limiting illustrated implementation. The upper portion 104a of the charger case 104 includes a housing 130, insulation 132, a PCBA 134 with contacts 135, a negative battery contact 136, a battery contact and spring 138 coupled to the negative battery contact, a battery 140 (e.g., AAA battery), and a cap 142. FIG. 8A is a first side elevational view of the upper portion 104a of the charger case 104. FIG. 8B is a sectional view of the upper portion 104a of the charger case 104 taken along the line A-A of FIG. 8A. FIG. 8C is a second side elevational view of the upper portion 104a of the charger case 104. FIG. 8D is a sectional view of the upper portion 104a of the charger case 104 taken along the line B-B of FIG. 8C.

Figures 9A, 9B, 9C:
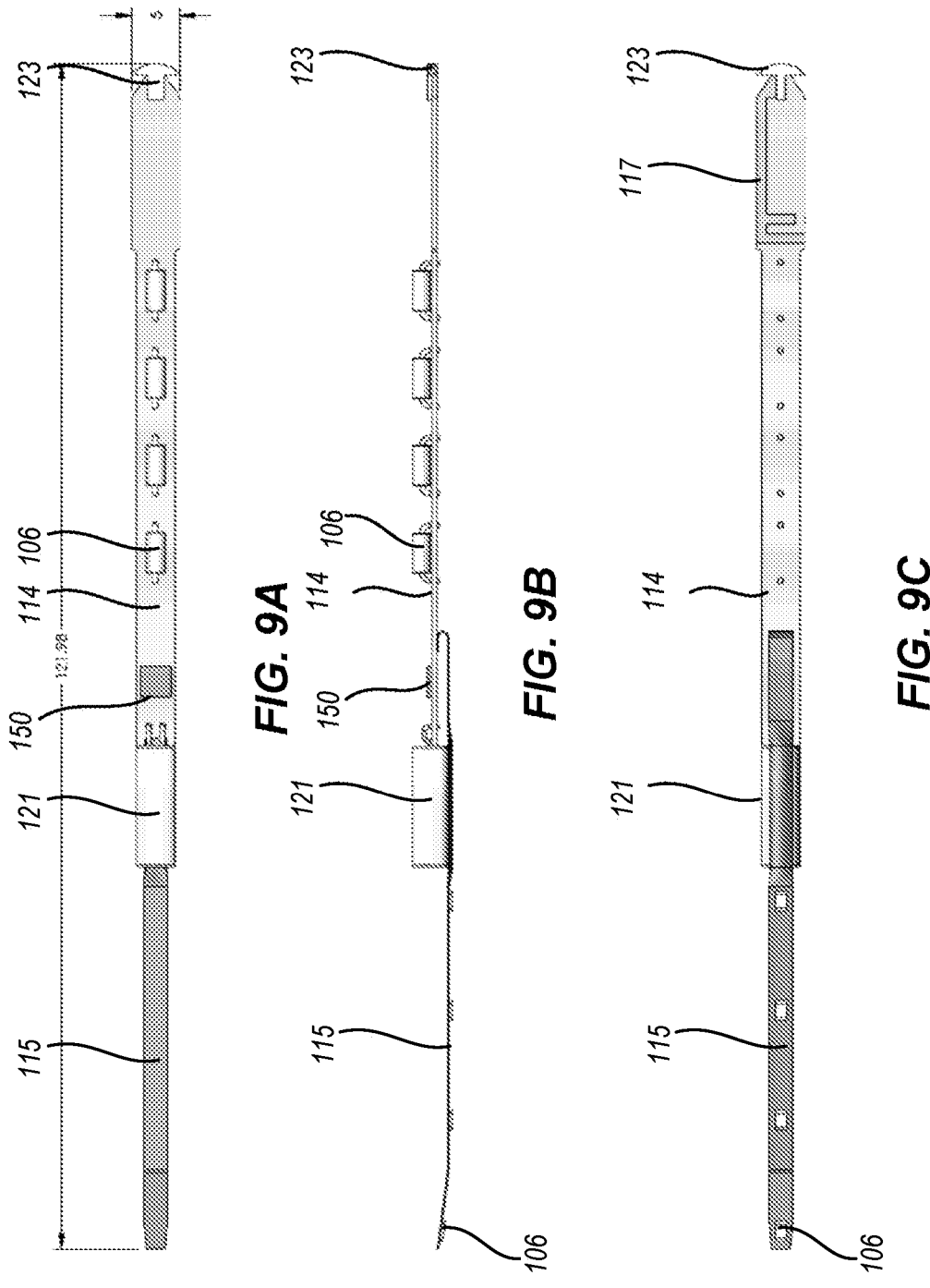
FIG. 9A is a top view of a printed circuit board assembly and flexible printed circuit of the temperature probe.
FIG. 9B is a side elevational view of the printed circuit board assembly and flexible printed circuit of the temperature probe.
FIG. 9C is a bottom view of the printed circuit board assembly and flexible printed circuit of the temperature probe.

FIG. 9A is a top view of the PCBA 114 and FPC 115 of the temperature probe 102. FIG. 9B is a side elevational view of the PCBA 114 and FPC 115 of the temperature probe 102. FIG. 9C is a bottom view of the PCBA 114 and FPC 115 of the temperature probe 102. The PCBA 114 and FPC 115 include the control unit 150 (e.g., microprocessor, radio) and a linear array of temperature sensors 106 comprising a plurality of thermistors (four shown), a plurality of IC temperature sensors (four shown), a charging contact 156 that electrically couples to a contact of the charger case 104 during charging, a pad 158 for the charging contact 156, a charging contact trace 117 which may also function as the RF antenna, as discussed above, and a rechargeable power source 121 (e.g., battery).

FIG. 10 is a diagram that illustrates communication between the temperature probe 102 and one or more external devices 162 and 164, according to one non-limiting illustrated implementation. In the illustrated example, the external device 162 comprises a smartphone 162 and the external device 164 comprises a cooking device (e.g., oven, grill, smoker, etc.). The external devices 162 may 164 may be other types of devices, such as tablet computers, laptop computers, wearable computers, remote server computers, other cooking devices or cooking control devices, etc. In the illustrated example, the time step is 500 ms, but other time step values may be used. At each time step, the temperature probe 102 transmits a Bluetooth LE beacon using, e.g., BLE 4, BLE 5, or other protocol. In at least some implementations, the beacon may include a device ID, battery percentage, and temperature data from the sensors 106 of the temperature probe 102. As discussed above, the temperature data may include temperature or voltage measurements from the sensors, or may alternatively include coefficients of a curve fit to the temperature sensor measurements to reduce data transmission and power requirements. In operation, the external devices 162 or 164 may receive the data, and may process or render the data in a number of ways. For example, the external devices 162 and 164 may provide visual or textual information regarding the current status of a cooking process, or they may provide predictions regarding the cooking process, such as a predicted time at which the food will be done. In at least some implementations, the external devices 162 and 164 may use the received temperature data to control the operation of a cooking device, which may include adjusting the conditions of the cooking environment (e.g., temperature, humidity, smoke, etc.), to achieve a desired cooking result.

Figure 12B:
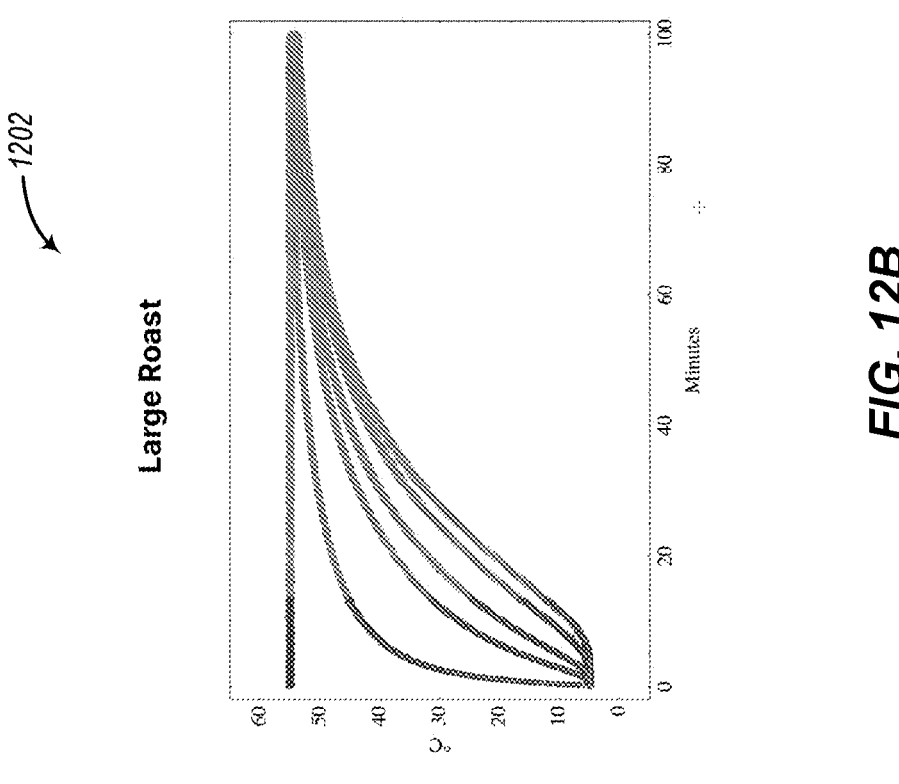
FIG. 12B is a graph that shows temperature gradients measured by a plurality of temperature sensors of the temperature probe during a cooking process for a large roast, according to one non-limiting illustrated implementation.
Figure 12A:
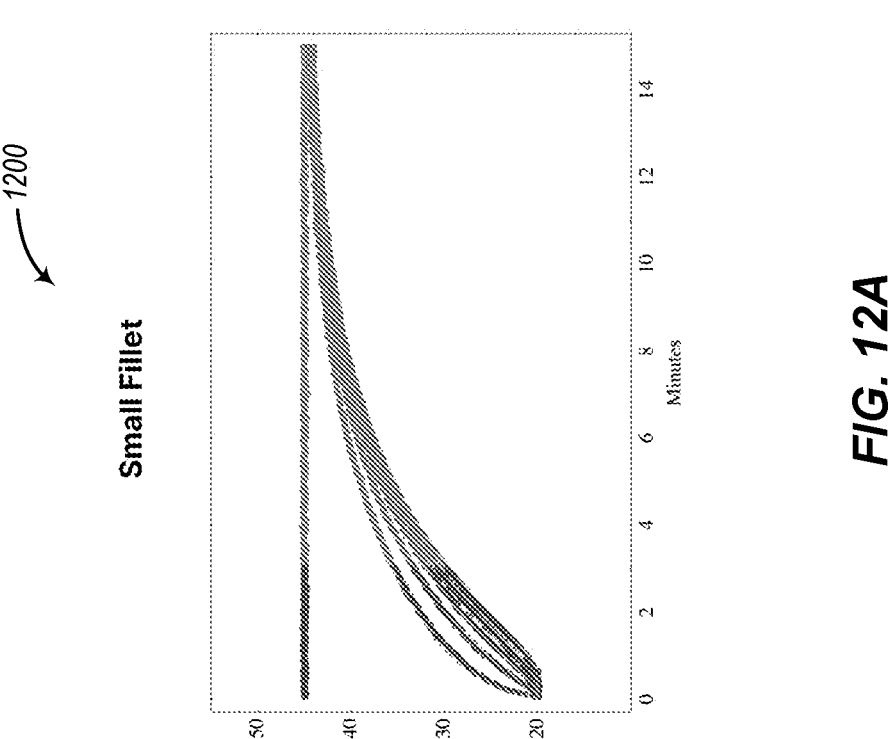
FIG. 12A is a graph that shows temperature gradients measured by a plurality of temperature sensors of the temperature probe during a cooking process for a small fillet, according to one non-limiting illustrated implementation.

FIG. 12A is a graph 1200 that shows temperature gradients measured by a plurality of temperature sensors 106 of the temperature probe 102 during a cooking process for a small fillet, according to one non-limiting illustrated implementation. By using the measured temperature gradients of the multiple sensors 106, the "ready at" time of the small fillet is able to be estimated within 4 minutes. FIG. 12B is a graph 1202 that shows temperature gradients measured by a plurality of temperature sensors 106 of the temperature probe 102 during a cooking process for a large roast, according to one non-limiting illustrated implementation. By using the measured temperature gradients of the multiple sensors 106, the "ready at" time of the large roast is able to be estimated within 16 minutes.

Figure 13:
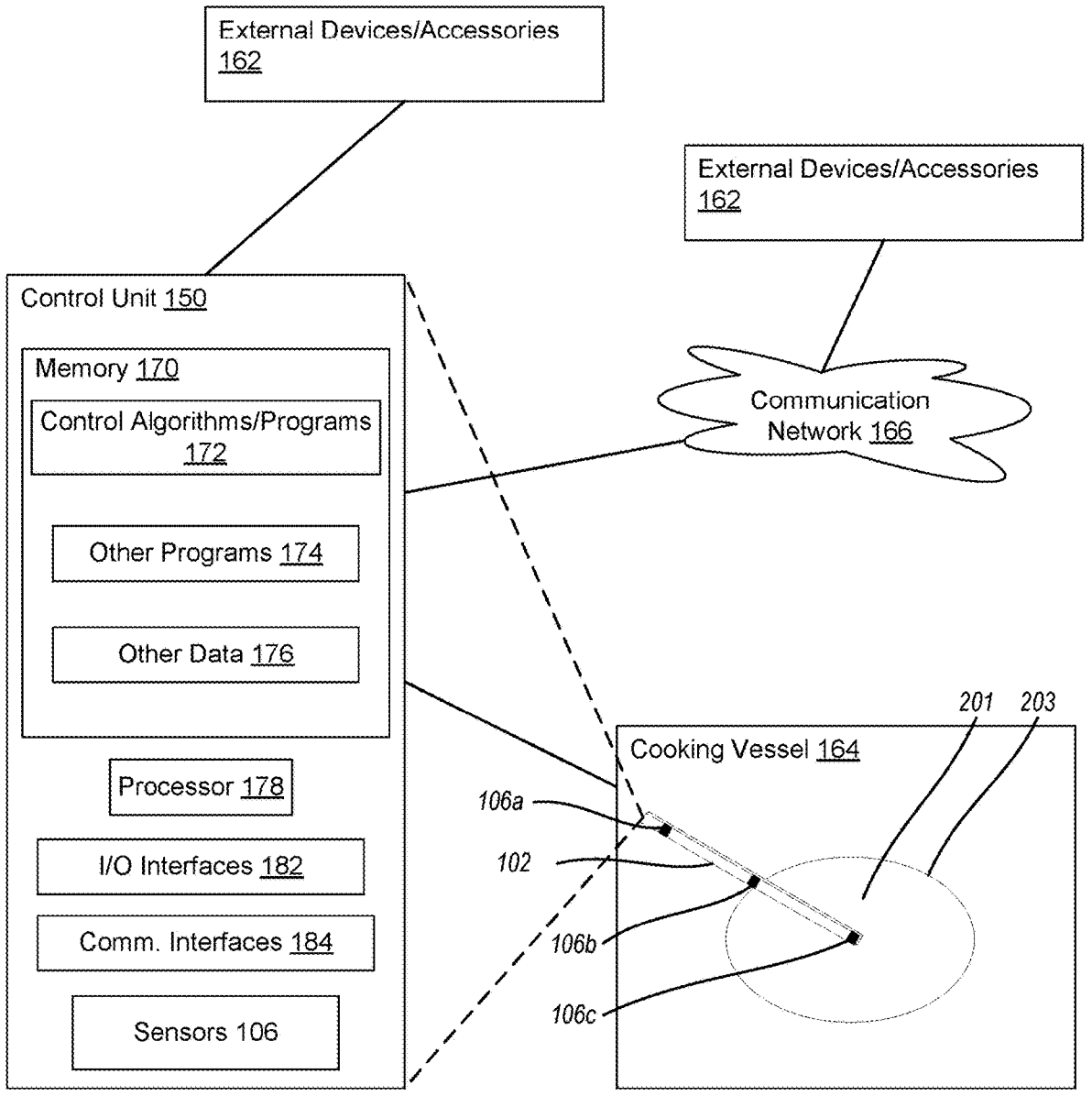
FIG. 13 is a schematic block diagram of the temperature probe that shows the various example components thereof and external devices that may interface with the temperature probe, according to one non-limiting illustrated implementation.
Figure 14:
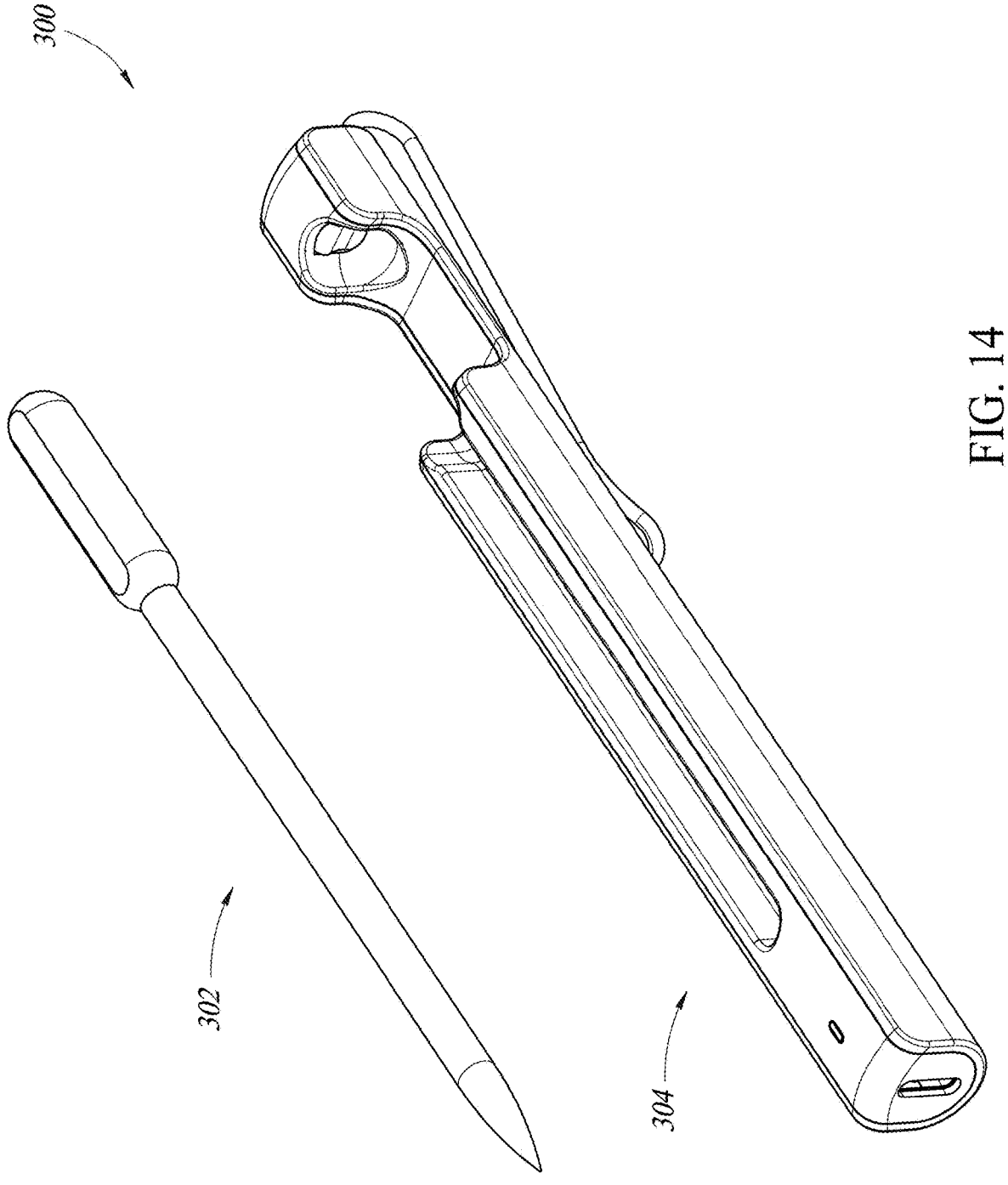
FIG. 14 is a perspective view of a food thermometer that includes a temperature probe and the charger case that houses the temperature probe for storage and for charging a battery of the temperature probe.
Figures 15A, 15B, 15C, 15D:
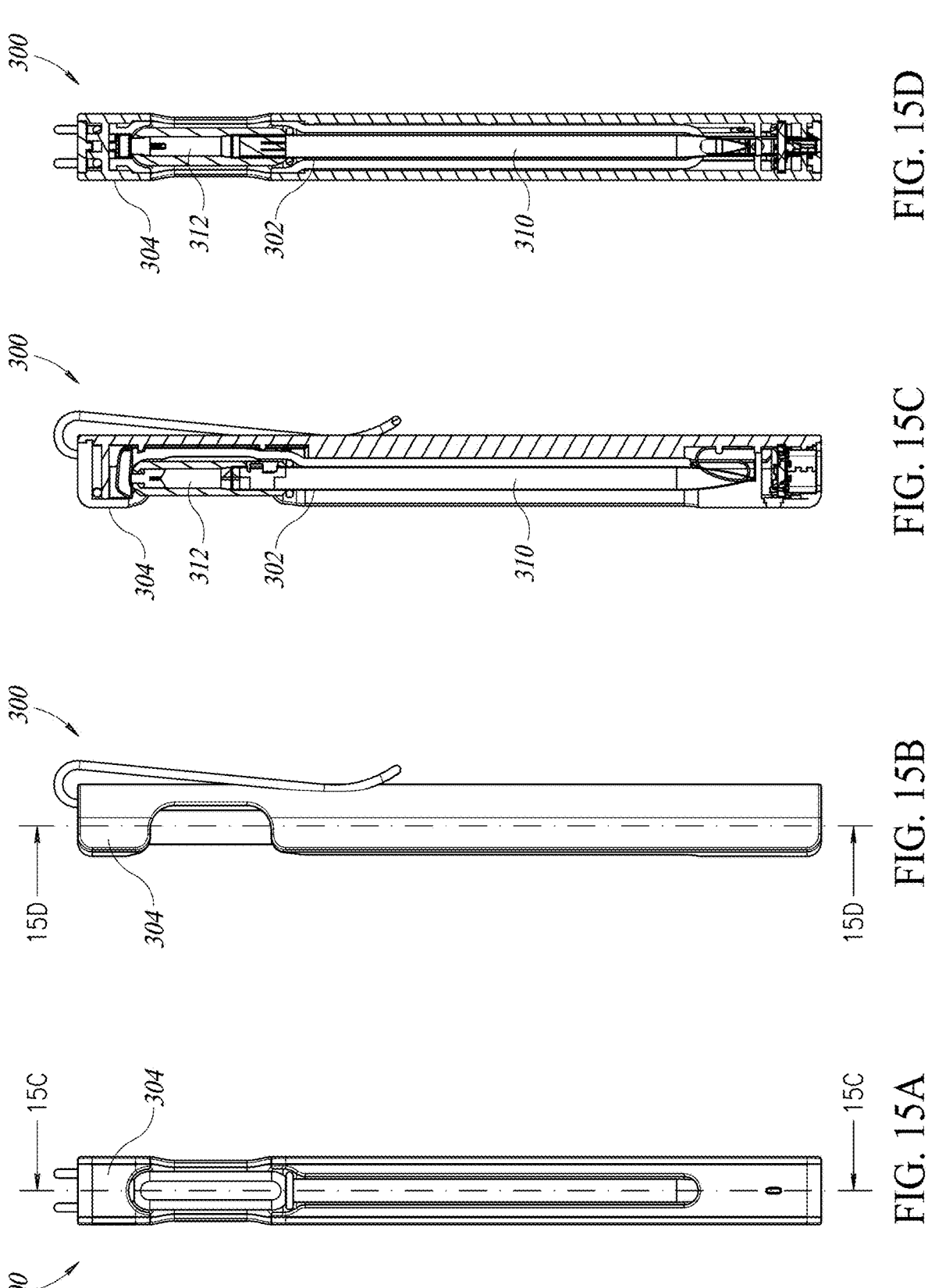
FIG. 15A is a front elevational view of the food thermometer of FIG. 14 with the temperature probe positioned inside the charger case.
FIG. 15B is a side elevational view of the food thermometer of FIG. 14 with the temperature probe positioned inside the charger case.
FIG. 15C is a sectional view of the food thermometer of FIG. 14 taken along the line 15C-15C of FIG. 15A.
FIG. 15D is a sectional view of the food thermometer of FIG. 14 taken along the line 15D-15D of FIG. 15B.
Figure 16:
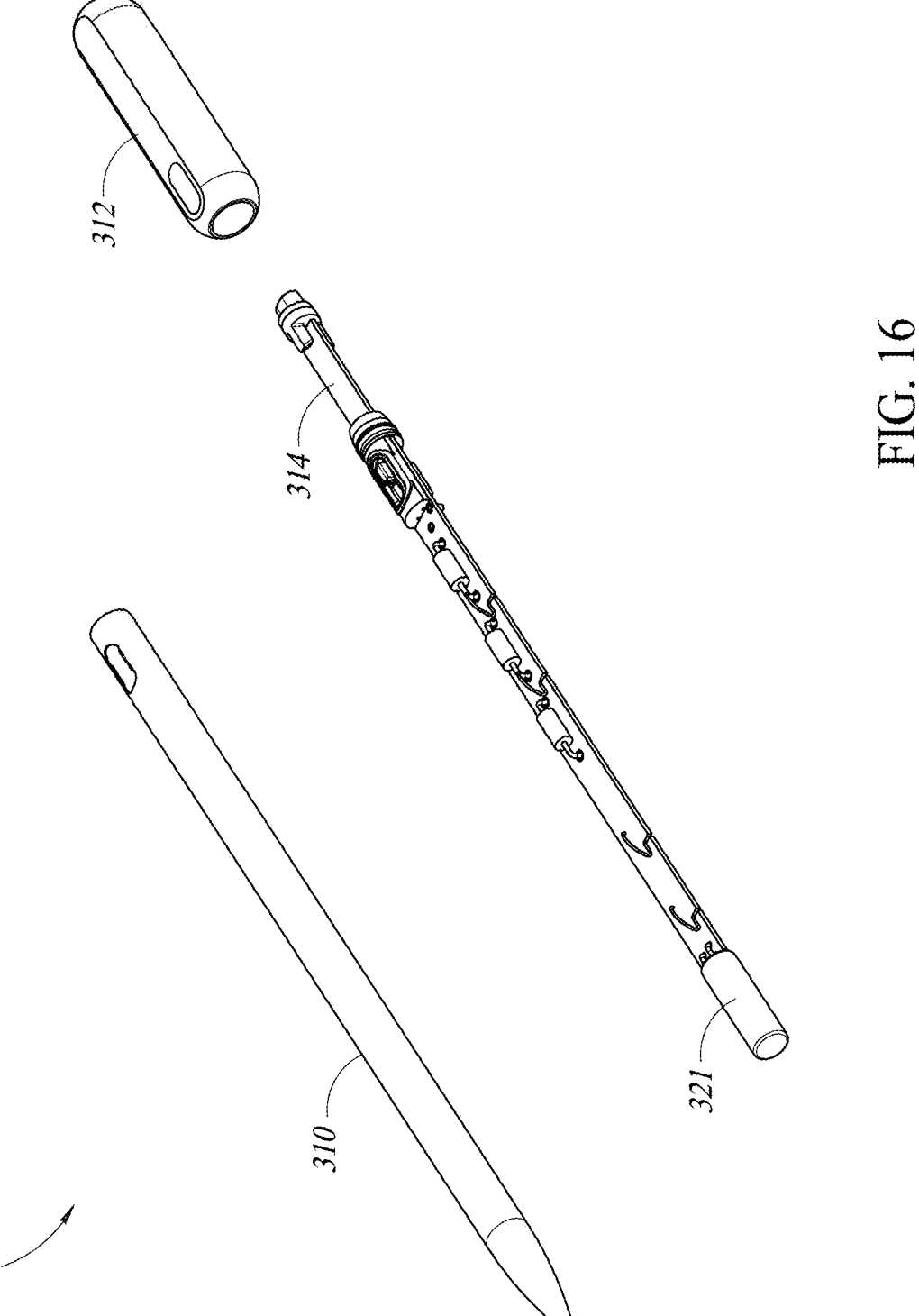
FIG. 16 is an exploded view of the temperature probe of FIG. 14.
Figures 17A, 17B, 17C, 17D:
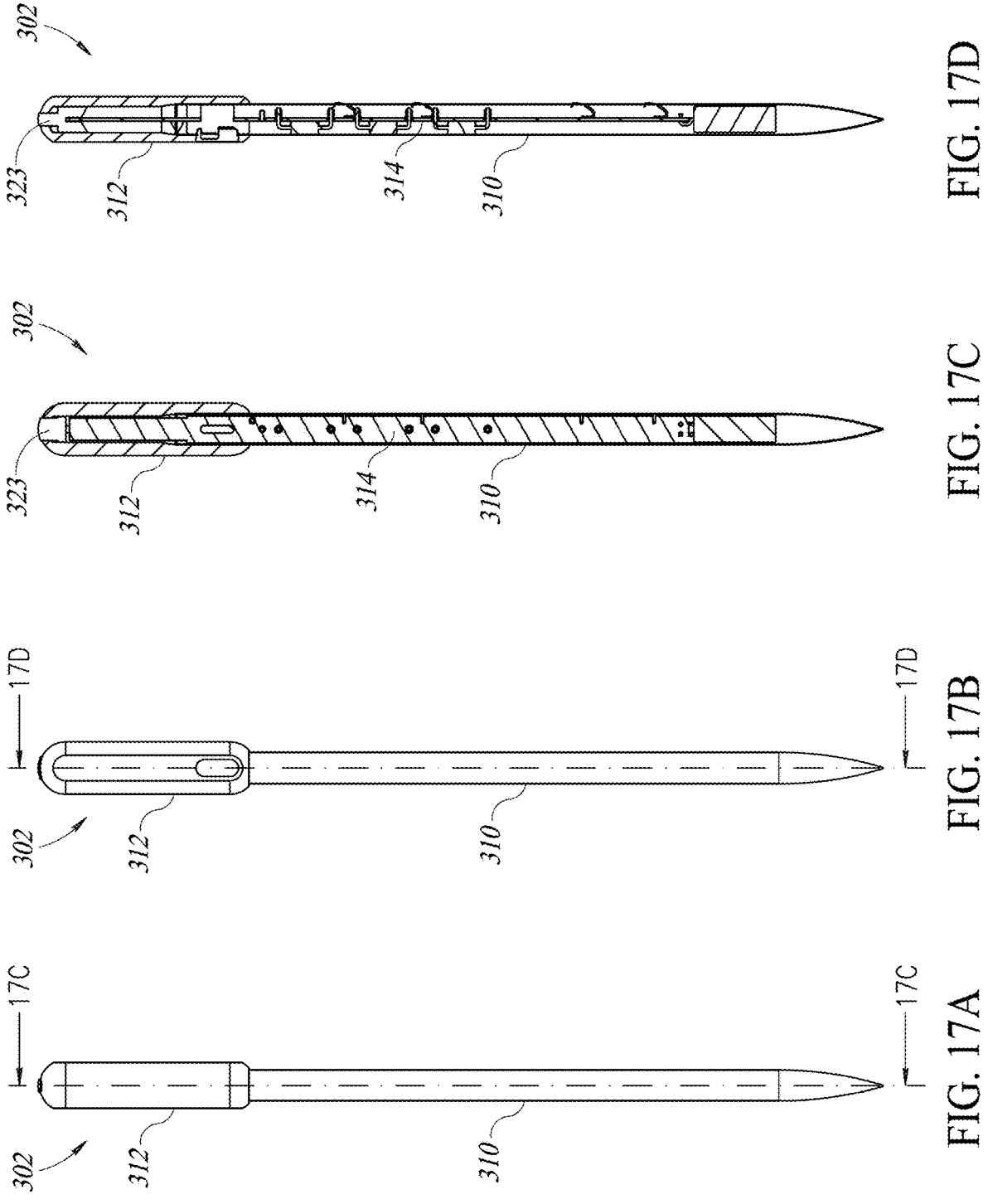
FIG. 17A is a side elevational view of the temperature probe of FIG. 16.
FIG. 17B is a rear elevational view of the temperature probe of FIG. 16.
FIG. 17C is a sectional view of the temperature probe of FIG. 16 taken along the line 17C-17C of FIG. 17A.
FIG. 17D is a sectional view of the temperature probe of FIG. 16 taken along the line 17D-17D of FIG. 17B.
Figure 18:
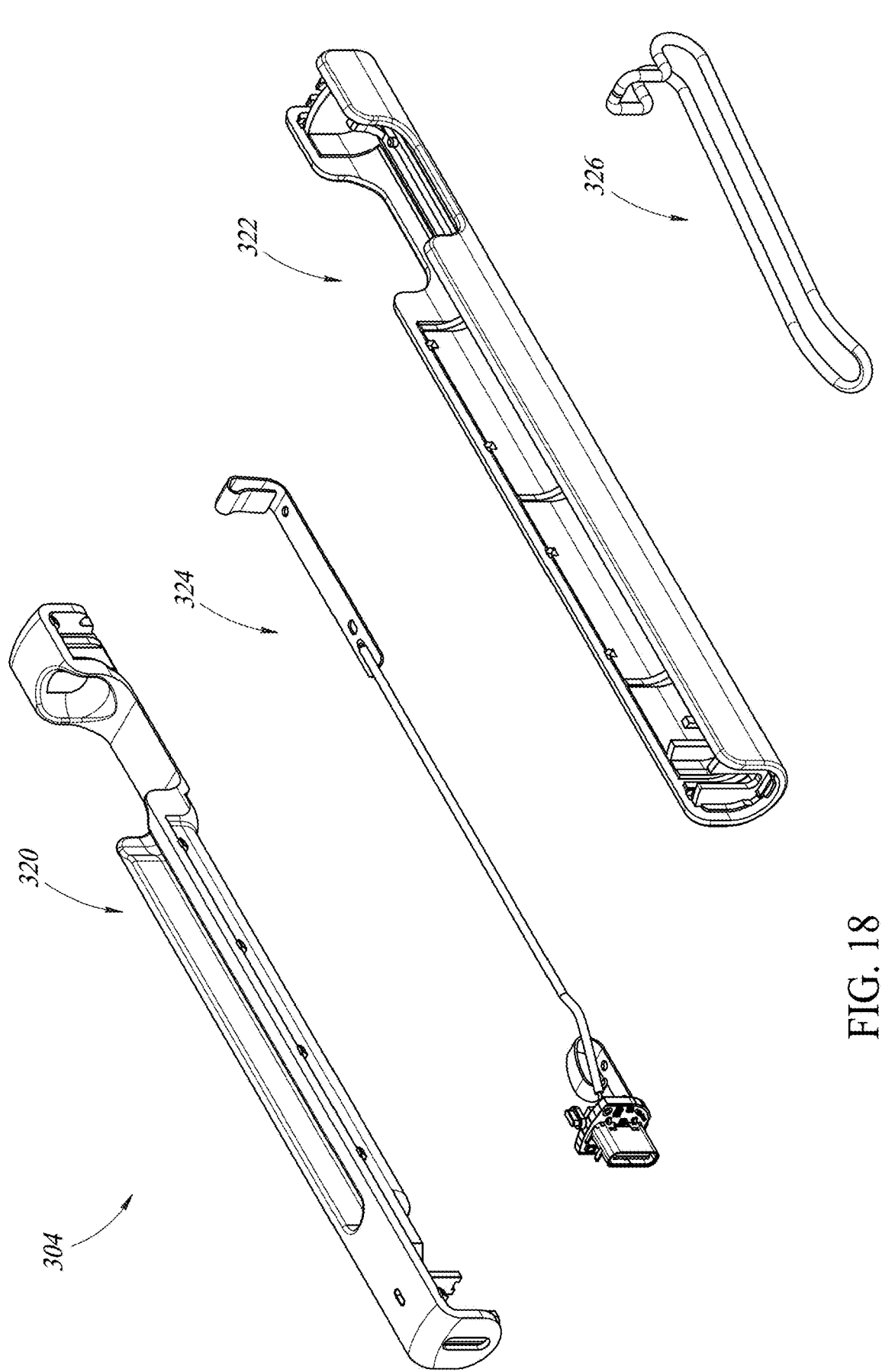
FIG. 18 is an exploded view of the charger case of FIG. 14.
Figures 19A, 19B, 19C, 19D:
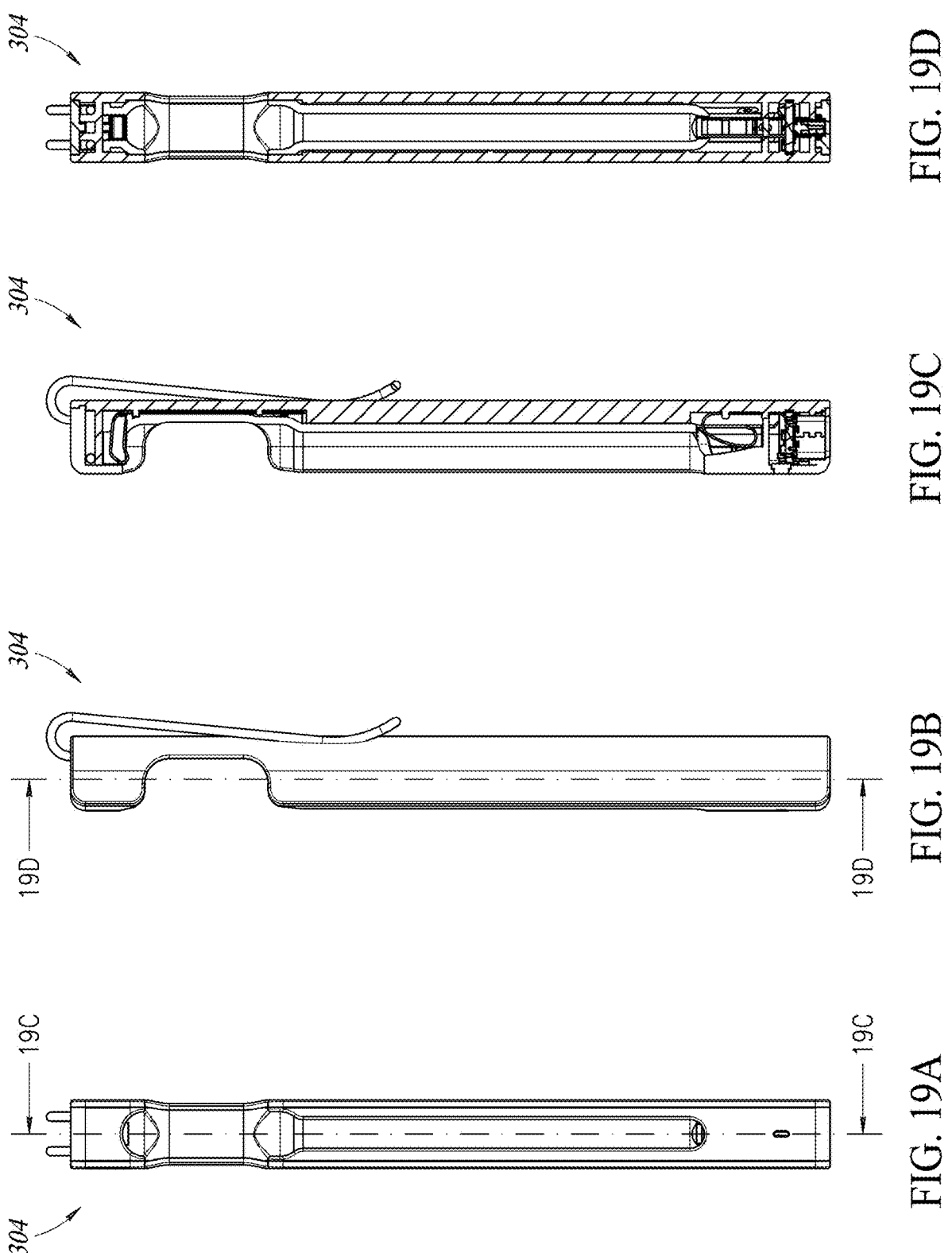
FIG. 19A is a front elevational view of the charger case of FIG. 14 with the temperature probe removed from the charger case.
FIG. 19B is a side elevational view of the charger case of FIG. 14 with the temperature probe removed from the charger case.
FIG. 19C is a sectional view of the charger case of FIG. 14 taken along the line 19C-19C of FIG. 19A.
FIG. 19D is a sectional view of the charger case of FIG. 14 taken along the line 19D-19D of FIG. 19B.
Figures 20A, 20B, 20C:
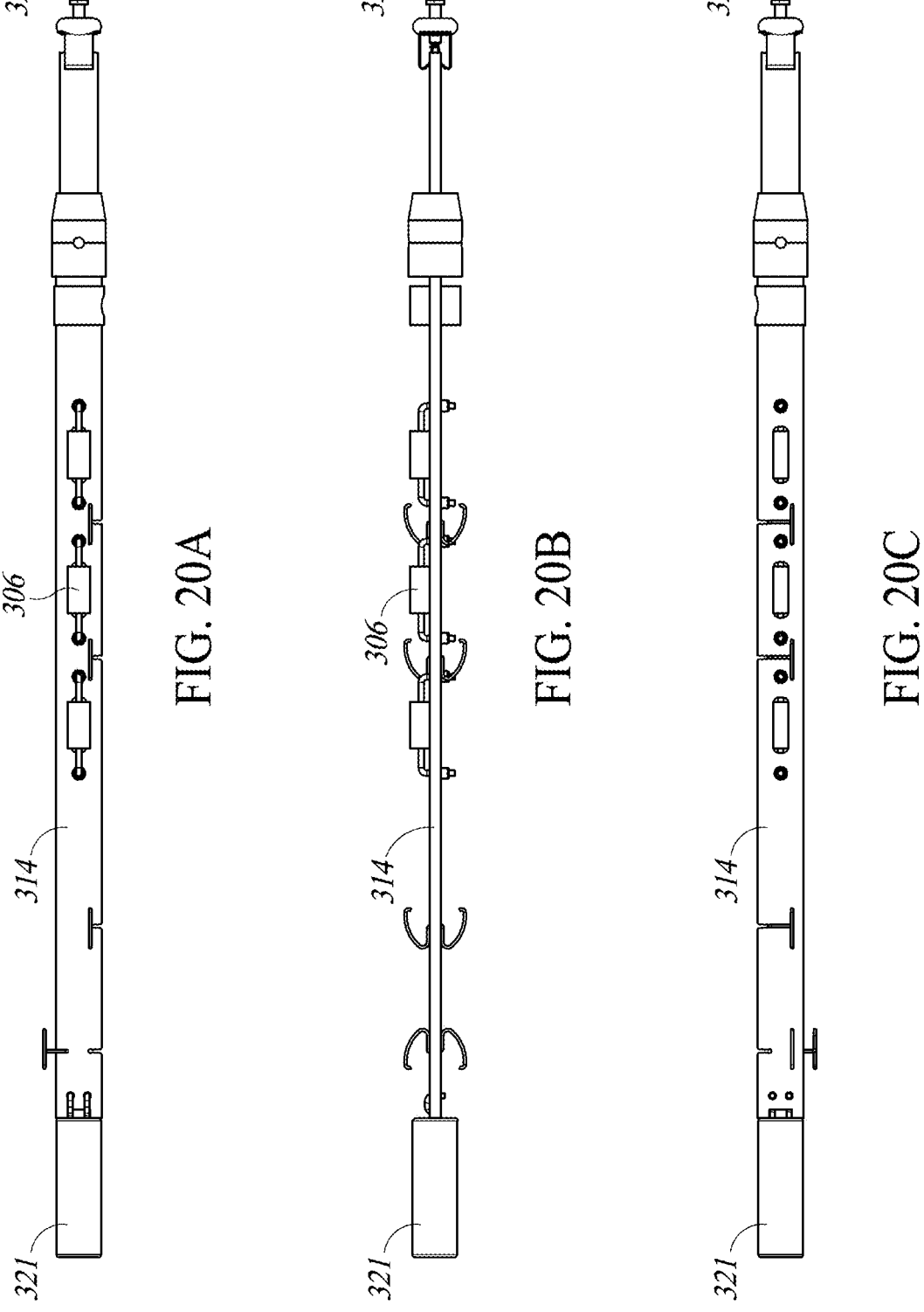
FIG. 20A is a top view of components of the temperature probe of FIG. 14.
FIG. 20B is a side elevational view of the components of FIG. 20A.
FIG. 20C is a bottom view of the components of FIG. 20A.

FIG. 13 is a schematic block diagram of the temperature probe 102 that shows the various example components thereof and external devices 162 and 164 that may interface with the temperature probe, according to one non-limiting illustrated implementation. As discussed elsewhere herein, the control unit 150 may be operative to receive temperature or other input from the sensors 106, and to transmit data to external devices 162 and 164 indicative of the temperature readings provided by the sensors 106. The control unit 150 is positioned inside the temperature probe 102, as shown in FIGS. 9A and 9B and discussed above. One or more special-purpose computing systems may be used to implement the control unit 150, such as a system on a chip (SoC), a microcontroller, etc. Accordingly, various embodiments described herein may be implemented in software, hardware, firmware, or in some combination thereof. The control unit 150 may also include memory 170, one or more processors 178, other I/O interfaces 182, and communications interfaces 184 (e.g., Bluetooth LE radio, or other interfaces).

The processor 178 includes one or more processing devices that execute computer instructions to perform actions, including at least some embodiments described herein. In various embodiments, the processor 178 may include one or more central processing units ("CPU"), programmable logic, or other processing or control circuitry.

The memory 170 may include one or more various types of non-volatile and/or volatile storage technologies. Examples of memory 170 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The memory 170 may be utilized to store information, including computer-readable instructions that are utilized by processor 178 to perform actions, including embodiments described herein.

The memory 170 may have stored thereon control algorithms or programs 172 that implement the functionality discussed herein. The memory 170 may also store other programs 174 and other data 176 to provide various functionality for the control unit 150.

Communications interfaces 184 are configured to communicate with other computing devices via wired or wireless connections (e.g., over communication network 166). As an example, the communications interfaces 184 may allow the control unit 150 to communicate with one or more external devices or accessories 162, which may include temperature sensors, humidity sensors, mobile computing devices (e.g., smartphone, tablet computer), remote servers, cooking vessels or devices 164, etc. The communications interfaces 184 may include one or more wired interfaces (e.g., USB®), and/or wireless interfaces (e.g., Bluetooth®, Wi-Fi®), as discussed above.

In the simplified embodiment illustrated in FIG. 13, the temperature probe 102 includes an ambient environment sensor 106a, a food surface sensor 106b, and an internal food sensor 106c. As discussed above, in at least some implementations the temperature probe 102 may include a different number of temperature sensors, such as four sensors, six sensors, eight sensors, ten sensors, etc., and may include a combination of different types of sensors (e.g., thermistors, IC sensors). As shown schematically in FIG. 13, the user may insert the temperature probe 102 into the food product 201 such that the ambient environment sensor 106a is positioned outside of the food product 201 inside the cooking chamber of the cooking vessel 164 (e.g., oven, grill, smoker), the food surface sensor 106b is positioned at the surface 203 of the food product 201, and the internal food sensor 106c is positioned within the food product.

Thus, using the temperature probe 102, the control unit 150 may simultaneously receive temperature data inside the food product 201, at the surface 203 of the food product, and within the cooking chamber of the cooking vessel 164. The control unit 150 may process and transmit such data, as discussed elsewhere herein, for use by users or other devices.

Other devices 162 and 164 may use the received data to optimally control the cooking conditions inside the cooking chamber. As an example, the temperature at the surface 203 of the food product 201 is the actual cooking temperature for the food product 201, so such information can be used to precisely control this cooking temperature. Further, if an external device 162 or 164 determines that the internal temperature of the food product 201 is well below the desired temperature, the device may cause the temperature of the cooking chamber to increase for a duration of time until the internal temperature is closer to the desired temperature, at which time the temperature may be decreased to complete the cooking process at a more controlled rate. By obtaining temperature data at the surface of the food product 201, the external device can also ensure that the cooking temperature that the food product is exposed to is maintained at a desired temperature or range of temperatures.

With reference to FIGS. 14-20C, one or more implementations of the present disclosure relate to a wireless multi-point food thermometer 300, which may have any of the features described elsewhere herein, such as the features described herein for the wireless multi-point food thermometer 100. The food thermometer 300 of the present disclosure may include a temperature probe 302 and a charger case 304. The temperature probe 302 may include a linear array of temperature sensors 306 (see FIGS. 20A and 20B) and a rechargeable power source or battery 321 arranged on a printed circuit board assembly (PCBA) 314.

The sensors 306 may be in thermal contact with a sensor tube or tip 310 that houses the sensors 306. In at least some implementations, the probe 302 itself and/or its sensor tube 310 may act as the neutral or negative terminal when the temperature probe 302 is charging, and another metal charging contact 323 in a handle region may act as the positive terminal. As also illustrated in FIGS. 14-20C, the temperature probe 302 also includes a handle 312 and the charging contact 323 that is exposed at or protrudes from a terminal end portion of the handle 312 opposite the sensor tube 310. As further illustrated in FIGS. 14-20C, the charger case 304 includes a first, front portion of a housing 320, a second, rear portion of a housing 322, charger contacts 324, which are housed between the front portion of the housing 320 and the rear portion of the housing 322, and a clip 326 for allowing a user to clip the multi-point food thermometer 300 to an apron or other garment.

Figures 21, 22:
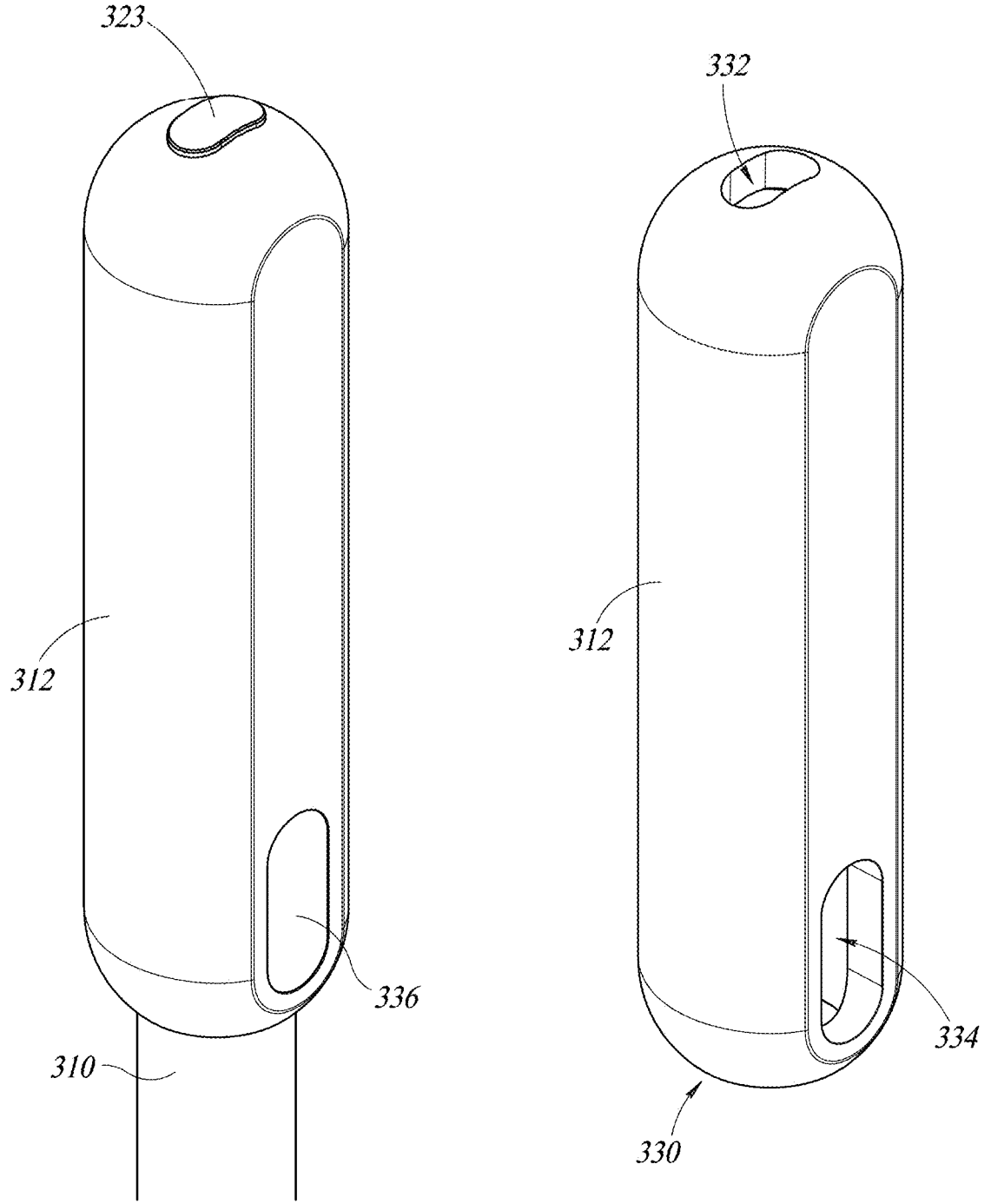
FIG. 21 illustrates a handle region of the temperature probe of FIG. 16.
FIG. 22 illustrates a handle of the temperature probe of FIG. 16.

FIG. 21 illustrates a larger view of the handle region of the probe 302, including the sensor tube 310 and the handle 312, which is mounted on an end of the sensor tube 310. The sensor tube 310 may be fabricated from a heat-conductive and electrically-conductive material, such as a metal such as steel (e.g., stainless steel), and the handle 312 may be fabricated from a heat-resistive or insulator and an electrically resistive or insulator material, such as a ceramic material. In some embodiments, the handle 312 is mechanically coupled to the sensor tube 310 in a way that secures and locks the handle 312 to the sensor tube 310 to resist axial and lateral forces as well as torques about a central longitudinal axis of the probe 302. Such coupling, securing, or attachment can be accomplished by purely mechanical features and without the use of adhesives or other chemical bonding agents such as glues or epoxies.

FIG. 22 illustrates the handle 312 by itself. As illustrated in FIG. 22, the handle 312 has an overall hollow cylindrical shape, with a first opening at a first terminal end portion 330 thereof to receive the sensor tube 310 and allow a terminal end portion of the sensor tube 310 to be positioned inside its hollow cylindrical body, as well as a second opening 332 at a second terminal end portion thereof, opposite the first, to receive the metal charging contact 323 and allow the metal charging contact 323 to be exposed at or extend outward from the second terminal end portion of the handle 312. As further illustrated in FIG. 22, the handle 312 has an oval aperture or opening 334 that extends through a sidewall thereof in a direction perpendicular to a central longitudinal axis of the probe 302, the sensor tube 310, and/or the handle 312. FIG. 21 illustrates that the probe 302 also includes an oval plug 336, which may be fabricated from a heat-conductive and electrically-conductive material, such as a metal such as steel (e.g., stainless steel), aluminum, or copper. When the probe 302 is assembled, the plug 336 extends through the opening 334 in the handle 312 and engages with the sensor tube 310 to lock and secure the handle 312 to the sensor tube 310.

Figures 23, 24:
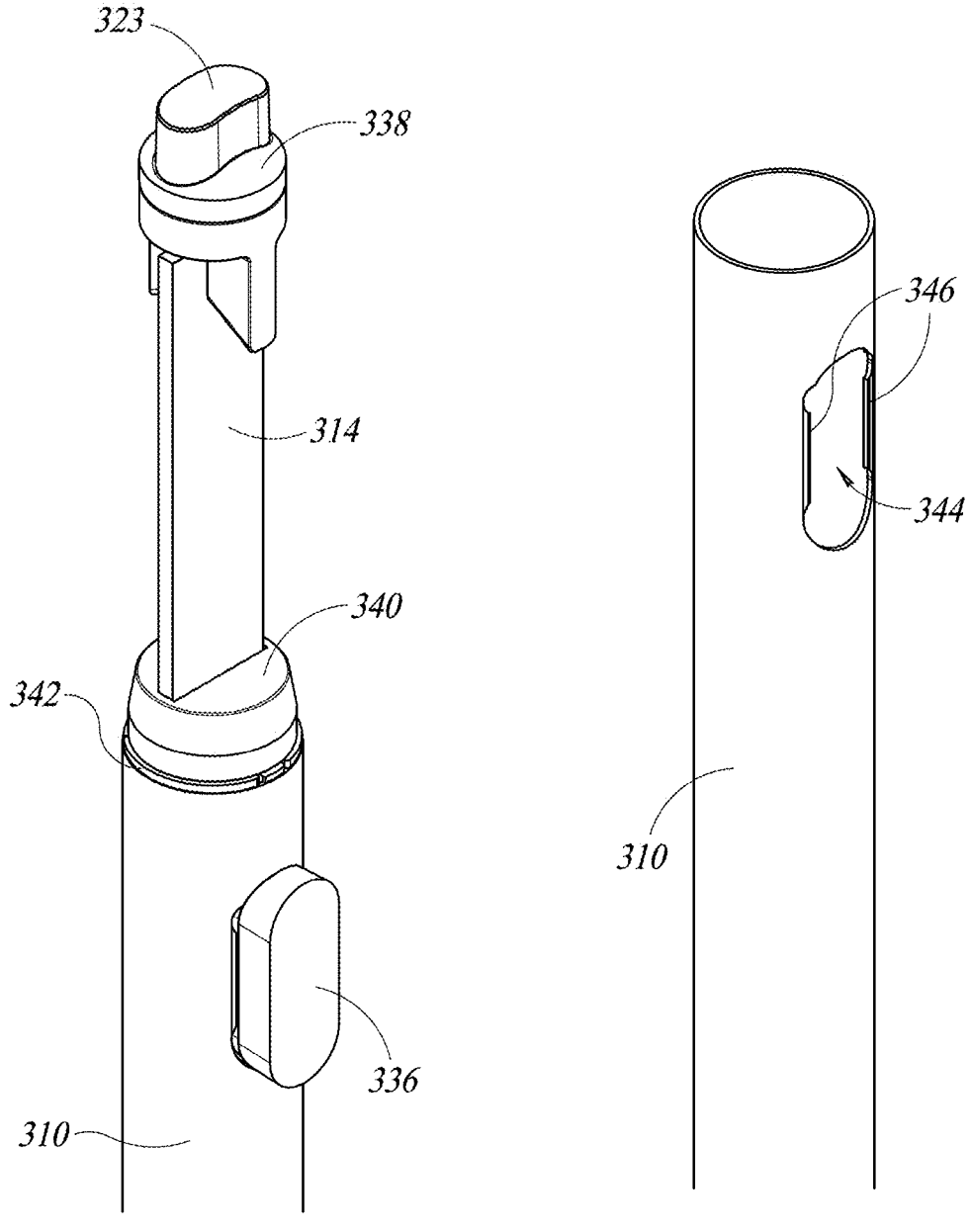
FIG. 23 illustrates a handle region of the temperature probe of FIG. 16 with the handle of FIG. 22 removed.
FIG. 24 illustrates a sensor tube of the temperature probe of FIG. 16.

FIG. 23 illustrates the probe 302 with the handle 312 removed, to reveal additional features. As illustrated in FIG. 23, the probe 302 includes a first gasket or seal 338, which may be fabricated from a molded silicone or fluoroelastomer material. When the probe 302 is assembled, the seal 338 prevents intrusion of contaminants such as water or food particles through the opening 332 in the handle 312, that is, between the handle 312 and the metal charging contact 323. As also illustrated in FIG. 23, the probe 302 includes a force plate 342, which may be a disc spring, positioned on and engaged with a terminal end portion of the sensor tube 310. As also illustrated in FIG. 23, the probe 302 includes a second gasket or seal 340, which may be fabricated from a molded silicone or fluoroelastomer material. When the probe 302 is assembled, the seal 340 prevents intrusion of contaminants such as water or food particles between the force plate 342 and an inner surface of the handle 312 and/or the PCBA 314. Furthermore, the force plate 342 acts as a spring, with one end engaged with the terminal end portion of the sensor tube 310 and an opposing end engaged with the seal 340, such that the force plate applies positive pressure to and biases the seal 340 toward and against the inner surface of the handle 312 to improve and strengthen the resulting seal. In some embodiments, the force plate 342 can be made of an electrically conductive material such as a metallic material (e.g., stainless steel), and can ground the PCBA 314 to the sensor tube 310 at a location near a join between an antenna and its feedline etched into the PCBA 314.

FIG. 24 illustrates an end portion of the sensor tube 310 that engages with the handle 312 by itself. As illustrated in FIG. 24, the end portion of the sensor tube 310 has an overall hollow cylindrical shape. As further illustrated in FIG. 24, the sensor tube 310 has an oval aperture or opening 344 that extends through a sidewall thereof in a direction perpendicular to a central longitudinal axis of the probe 302, the sensor tube 310, and/or the handle 312, such that the opening 344 is aligned with the opening 334. When the probe 302 is assembled, the plug 336 extends through the opening 334 in the handle 312 and through the opening 344 in the sensor tube 310 to lock and secure the handle 312 to the sensor tube 310. FIG. 24 illustrates that the sensor tube 310 includes a pair of barbs or tabs 346 located at opposing edges of the opening 344. When the plug 336 is inserted through the openings 334 and 344, the plug 336 engages with the tabs 346 and deforms the tabs 346 in a manner that prevents retraction of the plug 336 out of the opening 334 and 344. Thus, in this manner, insertion of the plug 336 into the openings 334 and 336 locks the handle 312 to the sensor tube 310. In some embodiments, when the plug 336 is inserted through the openings 334 and 344, the plug 336 engages with the sensor tube 310 and the plug 336 is deformed, such as plastically, in a manner that prevents retraction of the plug 336 out of the openings 334 and 344, or elastically, such that the plug's original shape is restored after the insertion is complete, but the shape of the inserted plug 336 prevents retraction of the plug 336 out of the openings 334 and 344. In some embodiments, the end of the sensor tube 310 may be laser etched to create a textured pattern that provides a high-friction interface between the sensor tube 310 and the handle 312 to reduce or minimize movement of the handle 312 relative to the sensor tube 310 resulting from tolerances in the associated retention features.

Figures 25, 26:
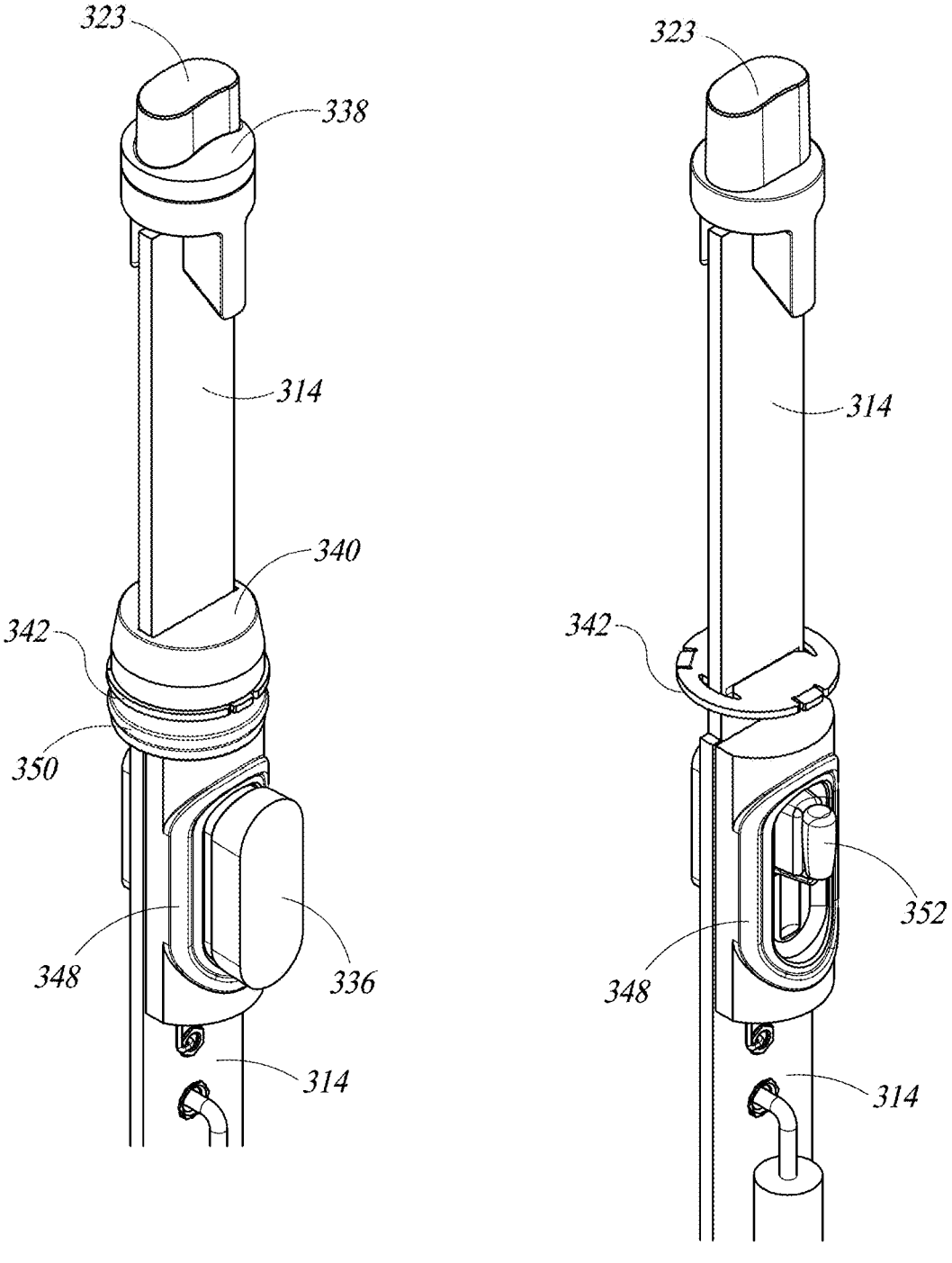
FIG. 25 illustrates a handle region of the temperature probe of FIG. 16 with the handle of FIG. 22 and the sensor tube of FIG. 24 removed.
FIG. 26 illustrates some of the same components as FIG. 25 with other components removed.

FIG. 25 illustrates the probe 302 with the handle 312 and the sensor tube 310 removed, to reveal additional features. As illustrated in FIG. 25, the probe 302 includes a third gasket or seal 348, which may be fabricated from a molded silicone or fluoroelastomer material. When the probe 302 is assembled, the seal 348 prevents intrusion of contaminants such as water or food particles through the opening 344 in the sensor tube 310, that is, between the sensor tube 310 and the plug 336 and/or the PCBA 314. As also illustrated in FIG. 25, the probe 302 includes a fourth gasket or seal 350, which may be fabricated from a molded silicone or fluoroelastomer material. When the probe 302 is assembled, the seal 350 prevents intrusion of contaminants such as water or food particles between the force plate 342 and an inner surface of the sensor tube 310 and/or the PCBA 314. In some embodiments, the second seal 340 and the fourth seal 350 may be manufactured as a single integral component.

FIG. 26 illustrates the same features of the probe 302 as in FIG. 25, but with additional components, including the plug 336, removed, to reveal additional features. As illustrated in FIG. 26, the probe 302 includes a temperature sensor 352, which may be a thermistor. When the probe 302 is assembled, the sensor 352 is located within a recess in an inner surface of the plug 336 and is engaged and in contact with, or in very close proximity to, an internal surface of the plug 336, and is therefore located within the handle 312 and/or within the handle region of the probe 302. Because the plug is fabricated from a heat-conductive material such as stainless steel, the plug 336 effectively forms a heat pipe that efficiently transfers heat between an outer environment (which is at the ambient temperature surrounding the probe 302) and the sensor 352. Thus, the sensor 352 can provide a more accurate measurement of the ambient temperature surrounding the probe 302 than if the sensor 352 was surrounded by the ceramic material of the handle 312 rather than the metallic material of the plug 336. In some embodiments, the sensor 352 can be grounded to the sensor tube 310.

FIGS. 27-33 illustrate features of another temperature probe 402. The temperature probe 402 can include any of the features described elsewhere herein, such as the features described herein for the temperature probe 102 and/or the temperature probe 302. The description of the features of the temperature probe 402 focus on differences between the temperature probe 402 and the temperature probe 102 and/or the temperature probe 302.

FIG. 27 illustrates a view of the handle region of the probe 402, including the sensor tube 410 and the handle 412, which is mounted on an end of the sensor tube 410. The sensor tube 410 may be fabricated from a heat-conductive and electrically-conductive material, such as a metal such as steel (e.g., stainless steel), and the handle 412 may be fabricated from a heat-resistive or insulator and an electrically resistive or insulator material, such as a ceramic material. In some embodiments, the handle 412 is mechanically coupled to the sensor tube 410 in a way that secures and locks the handle 412 to the sensor tube 410 to resist axial and lateral forces as well as torques about a central longitudinal axis of the probe 402. Such coupling, securing, or attachment can be accomplished by purely mechanical features and without the use of adhesives or other chemical bonding agents such as glues or epoxies.

FIG. 28 illustrates the handle 412 by itself. As illustrated in FIG. 28, the handle 412 has an overall hollow cylindrical shape, with a first opening at a first terminal end portion 430 thereof to receive the sensor tube 410 and allow a terminal end portion of the sensor tube 410 to be positioned inside its hollow cylindrical body, as well as a second opening 432 at a second terminal end portion thereof, opposite the first, to receive the metal charging contact 423 and allow the metal charging contact 423 to be exposed at or extend outward from the second terminal end portion of the handle 412. As further illustrated in FIG. 28, the handle 412 has an oval aperture or recess 434a and a circular opening 434b that extends from a base of the recess 434a through a sidewall of the handle 412 in a direction perpendicular to a central longitudinal axis of the probe 402, the sensor tube 410, and/or the handle 412. FIG. 27 illustrates that the probe 402 also includes an oval plug 436, which may be fabricated from a heat-conductive and electrically-conductive material, such as a metal such as steel (e.g., stainless steel), aluminum, or copper. When the probe 402 is assembled, the plug 436 extends through the recess 434a and the opening 434b in the handle 412 and engages with the sensor tube 410 to lock and secure the handle 412 to the sensor tube 410.

Figures 29, 30:
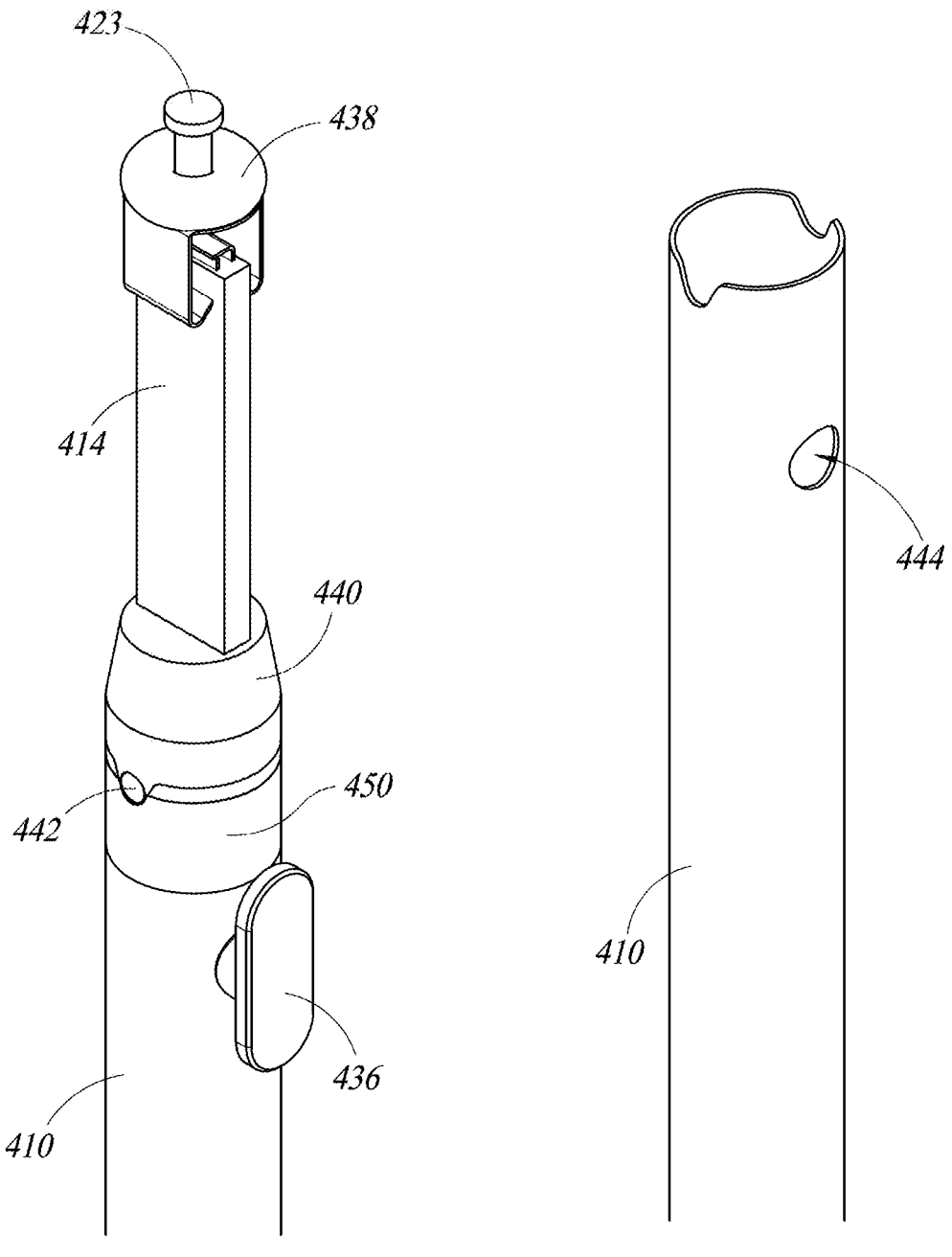
FIG. 29 illustrates the handle region of the temperature probe of FIG. 27 with the handle of FIG. 28 removed.
FIG. 30 illustrates a sensor tube of the temperature probe of FIG. 27.

FIG. 29 illustrates the probe 402 with the handle 412 removed, to reveal additional features. As illustrated in FIG. 29, the probe 402 includes a first gasket or seal 438, which may be fabricated from a molded silicone or fluoroelastomer material. When the probe 402 is assembled, the seal 438 prevents intrusion of contaminants such as water or food particles through the opening 432 in the handle 412, that is, between the handle 412 and the metal charging contact 423. As also illustrated in FIG. 29, the probe 402 includes a pin 442, which may extend through and be secured and/or locked to the PCBA 414. As also illustrated in FIG. 29, the probe 402 includes a second gasket or seal 440, which may be fabricated from a molded silicone or fluoroelastomer material. When the probe 402 is assembled, the seal 440 prevents intrusion of contaminants such as water or food particles between the pin 442 and an inner surface of the handle 412 and/or the PCBA 414. Furthermore, the pin 442 may apply positive pressure to and bias the seal 440 toward and against the inner surface of the handle 412 to improve and strengthen the resulting seal. In some embodiments, the pin 442 can be made of an electrically conductive material such as a metallic material (e.g., stainless steel), and can ground the PCBA 414 to the sensor tube 410 at a location near a join between an antenna and its feedline etched into the PCBA 414.

FIG. 30 illustrates an end portion of the sensor tube 410 that engages with the handle 412 by itself. As illustrated in FIG. 30, the end portion of the sensor tube 410 has an overall hollow cylindrical shape. As further illustrated in FIG. 30, the sensor tube 410 has a circular aperture or opening 444 that extends through a sidewall thereof in a direction perpendicular to a central longitudinal axis of the probe 402, the sensor tube 410, and/or the handle 412, such that the opening 444 is aligned with the recess 434a and the opening 434b. When the probe 402 is assembled, the plug 436 extends through the recess 434a and the opening 434b in the handle 412 and through the opening 444 in the sensor tube 410 to lock and secure the handle 412 to the sensor tube 410.

FIG. 31 illustrates the probe 402 with the handle 412 and the sensor tube 410 removed, to reveal additional features.

As illustrated in FIG. 31, the probe 402 includes a third gasket or seal 448, which may be fabricated from a molded silicone or fluoroelastomer material. When the probe 402 is assembled, the seal 448 prevents intrusion of contaminants such as water or food particles through the opening 444 in the sensor tube 410, that is, between the sensor tube 410 and the plug 436 and/or the PCBA 414. As also illustrated in FIG. 31, the probe 402 includes a fourth gasket or seal 450, which may be fabricated from a molded silicone or fluoroelastomer material. When the probe 402 is assembled, the seal 450 prevents intrusion of contaminants such as water or food particles between the pin 442 and an inner surface of the sensor tube 410 and/or the PCBA 414. In some embodiments, the second seal 440 and the fourth seal 450 may be manufactured as a single integral component.

FIG. 32 illustrates the same features of the probe 402 as in FIG. 31, but with additional components, including the plug 436, removed, to reveal additional features. As illustrated in FIG. 32, the probe 402 includes a temperature sensor 452, which may be a thermistor. When the probe 402 is assembled, the sensor 452 is located within a recess in an inner surface of the plug 436 and is engaged and in contact with, or in very close proximity to, an internal surface of the plug 436, and is therefore located within the handle 412 and/or within the handle region of the probe 402. Because the plug is fabricated from a heat-conductive material such as stainless steel, the plug 436 effectively forms a heat pipe that efficiently transfers heat between an outer environment (which is at the ambient temperature surrounding the probe 402) and the sensor 452. Thus, the sensor 452 can provide a more accurate measurement of the ambient temperature surrounding the probe 402 than if the sensor 452 was surrounded by the ceramic material of the handle 412 rather than the metallic material of the plug 436. In some embodiments, the sensor 452 can be grounded to the sensor tube 410.

Figure 33:
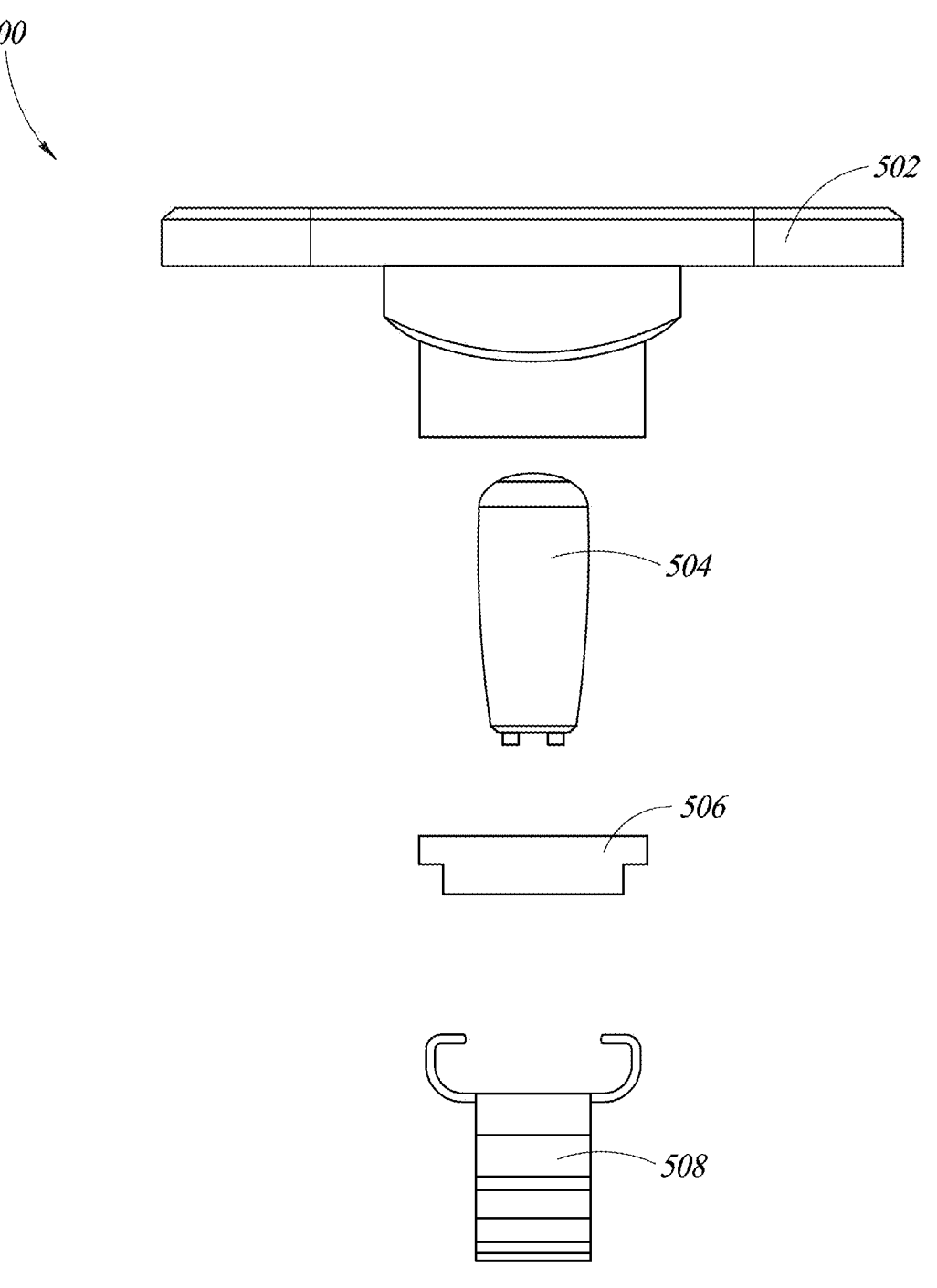
FIG. 33 illustrates a temperature sensor module.

FIG. 33 illustrates an exploded view of a temperature sensor module 500 that may be integrated into the probe 402, such as by replacing or supplementing the plug 436 and the sensor 452. As illustrated in FIG. 33, the temperature sensor module 500 includes a plug 502 which may have the same features as the plug 436, a temperature sensor 504, which may be a thermistor, an electrical isolator 506, which may be made of an electrically non-conductive, insulating, or highly resistive material, such as a ceramic, and a conductive clip 508, which may be made of an electrically conductive material such as a metal (e.g., stainless steel). When a temperature probe such as the probe 402 is assembled to include the temperature sensor module 500, a first one of the electrical leads of the temperature sensor 504 can be electrically coupled to the conductive clip 508, which may be mechanically clipped to and electrically coupled to the PCBA 414, and a second one of the electrical leads of the temperature sensor 504 can be electrically coupled to the plug 502 and thereby grounded. Such connections can be made without soldering, such as by simply pressing the various electrical leads into the respective components to which they are electrically coupled.

Figure 36:
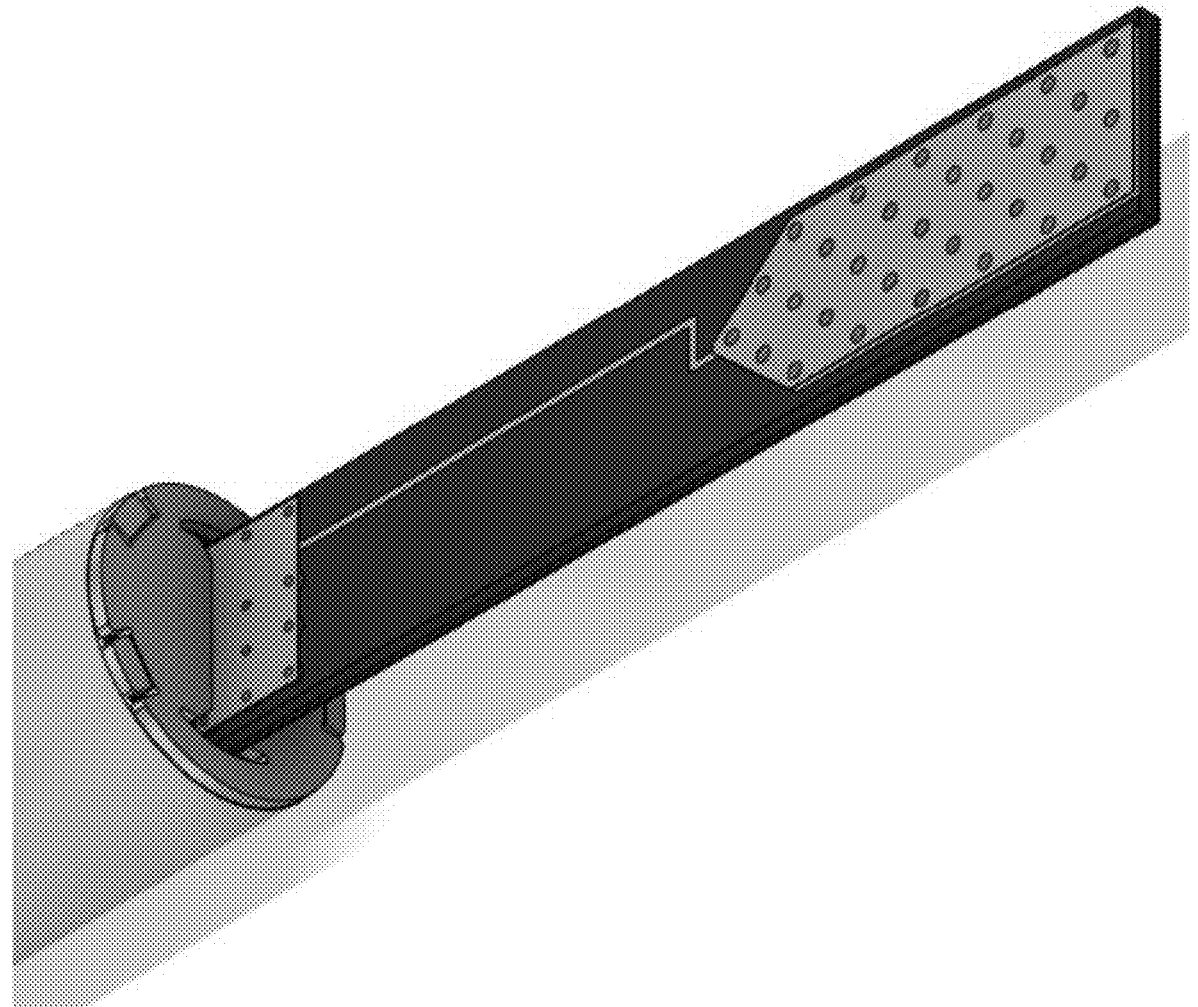
FIG. 36 illustrates a portion of a printed circuit board assembly at the handle region of the temperature probe of FIG. 16 illustrated in FIG. 21.
Figure 37:
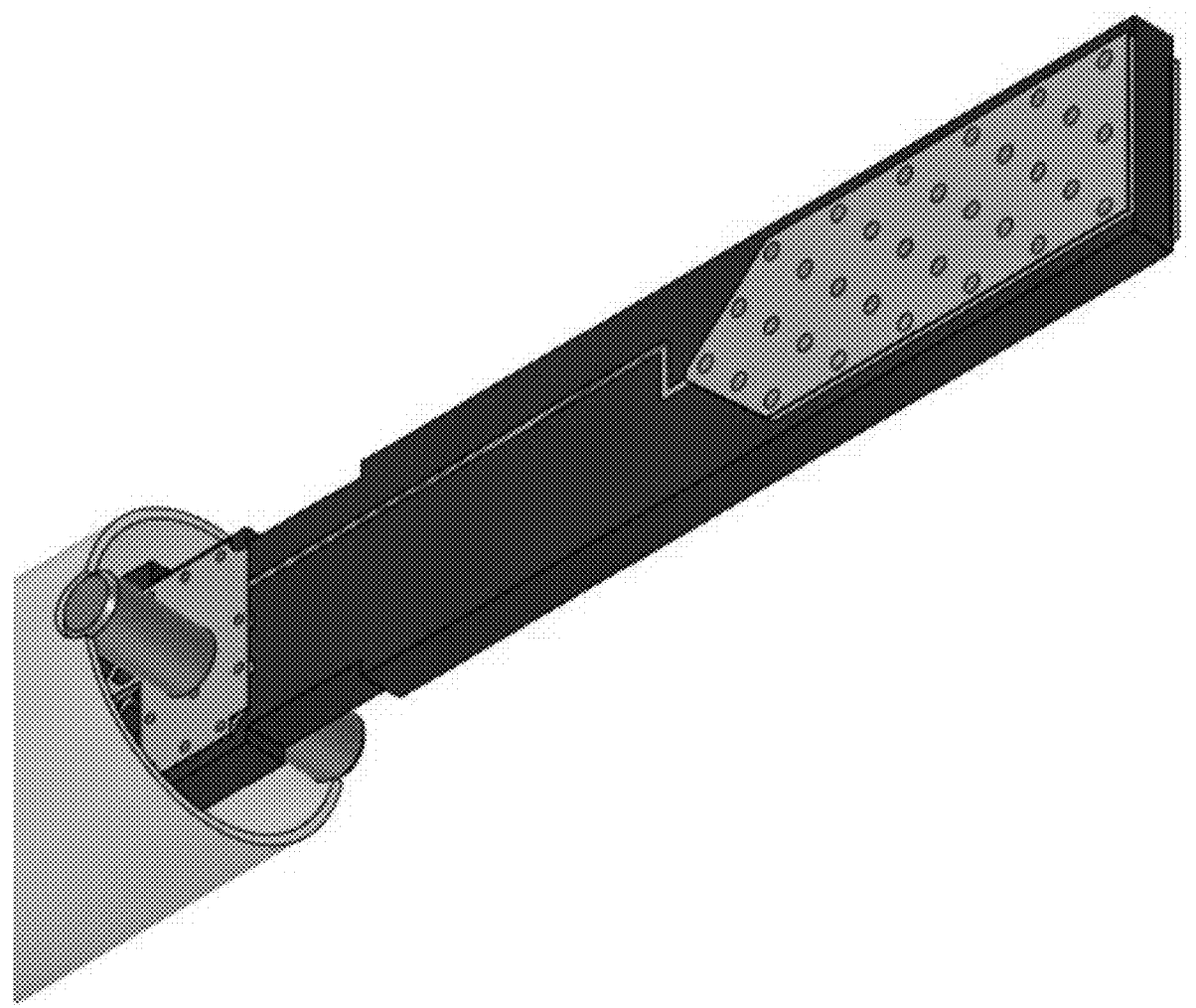
FIG. 37 illustrates a portion of a printed circuit board assembly at the handle region of the temperature probe illustrated in FIG. 27.

FIG. 36 illustrates a portion of the printed circuit board assembly 314 and FIG. 37 illustrates a similar portion of the printed circuit board assembly 414. FIGS. 36 and 37 illustrate that the force plate 342 and pin 442 electrically couple the respective printed circuit board assemblies 314, 414 to the respective sensor tubes 310, 410, thereby grounding the printed circuit board assemblies 314, 414, and that they do so near the respective joins between the respective feedlines into the respective antennas. The feed lines are isolated between an upper and lower ground plate layer in the printed circuit board assemblies 314, 414, and are not in electrical contact with the ground plane.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

U.S. provisional patent application No. 63/133,683, filed Jan. 4, 2021, to which this application claims priority, is hereby incorporated herein by reference, in its entirety.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A multi-point food thermometer, comprising:
a metallic sensor tube that houses a plurality of temperature sensors; and
a ceramic handle mechanically coupled to the metallic sensor tube, the ceramic handle including an opening;
a printed circuit board disposed at least partially within the ceramic handle;
an antenna etched into the printed circuit board; and
a metal charging contact that extends from within the ceramic handle through the opening to an exterior of the ceramic handle, the metal charging contact being electrically integrated with the etched antenna.

2. The multi-point food thermometer of claim 1 wherein the ceramic handle is not coupled to the metallic sensor tube by adhesives or other chemical bonding agents.

3. The multi-point food thermometer of claim 1 wherein:
the metallic sensor tube includes a first opening;
the ceramic handle includes a second opening; and
the multi-point food thermometer includes a plug that extends through the first and second openings to secure the ceramic handle to the metallic sensor tube.

4. The multi-point food thermometer of claim 3 wherein the plug has a higher thermal conductivity than the ceramic handle.

5. The multi-point food thermometer of claim 3, further comprising:
a metallic clip that is in electrical contact with a first lead of a first temperature sensor and that is in electrical contact with a printed circuit board; and
an electrical isolator that is attached to the metallic clip, that electrically isolates a second lead of the first temperature sensor from the metallic clip and from the first lead of the first temperature sensor;
wherein the second lead of the first temperature sensor is electrically grounded;
wherein the metallic clip and the electrical isolator mechanically couple the first temperature sensor to the printed circuit board;
wherein no solder is used to couple the first temperature sensor to the printed circuit board.

6. The multi-point food thermometer of claim 3, further comprising a temperature sensor located inside a recess in the plug.

7. The multi-point food thermometer of claim 1, further comprising:
a printed circuit board and an elastomeric seal that creates a seal between the ceramic handle and the printed circuit board; and
a metallic pin that extends through the printed circuit board and biases the seal toward a surface of the ceramic handle.

8. The multi-point food thermometer of claim 7, wherein the metallic pin is in electrical contact with the metallic sensor tube and with the printed circuit board to create a grounding connection between the metallic sensor tube and the printed circuit board near a join between a feedline and an antenna etched into the printed circuit board.

9. A multi-point food thermometer, comprising:
a metallic sensor tube that houses a plurality of temperature sensors, a first temperature sensor of the plurality of temperature sensors having a first lead and a second lead, the second lead of the first temperature being electrically grounded, the metallic sensor tube including a first opening;
a ceramic handle mechanically coupled to the metallic sensor tube, the ceramic handle including a second opening;
a metallic clip that is in electrical contact with the first lead of the first temperature sensor and that is in electrical contact with a printed circuit board;
an electrical isolator that is attached to the metallic clip, that electrically isolates the second lead of the first temperature sensor from the metallic clip and from the first lead of the first temperature sensor;
a plug extending through the first and second openings to secure the ceramic handle to the metallic sensor tube,
wherein the metallic clip and the electrical isolator mechanically couple the first temperature sensor to the printed circuit board, and
wherein no solder is used to couple the first temperature sensor to the printed circuit board.

10. A multi-point food thermometer, comprising:
a metallic sensor tube that houses a plurality of temperature sensors;
a ceramic handle, wherein the ceramic handle is mechanically coupled to the metallic sensor tube;
a printed circuit board and an elastomeric seal that creates a seal between the ceramic handle and the printed circuit board; and
a metallic pin that extends through the printed circuit board and biases the seal toward a surface of the ceramic handle.

11. The multi-point food thermometer of claim 10, wherein the metallic pin is in electrical contact with the metallic sensor tube and with the printed circuit board to create a grounding connection between the metallic sensor tube and the printed circuit board near a join between a feedline and an antenna etched into the printed circuit board.

* * * * *